(12) United States Patent
Okazaki et al.

(10) Patent No.: US 11,901,772 B2
(45) Date of Patent: Feb. 13, 2024

(54) ROTATING ELECTRICAL MACHINE

(71) Applicant: Mitsubishi Electric Corporation, Tokyo (JP)

(72) Inventors: Kodai Okazaki, Tokyo (JP); Kenta Motoyoshi, Tokyo (JP); Yuji Takizawa, Tokyo (JP); Hiroko Ikeda, Tokyo (JP); Hidenori Sasaki, Tokyo (JP); Yu Hirotani, Tokyo (JP); Satoru Akutsu, Tokyo (JP); Masafumi Okazaki, Tokyo (JP); Natsumi Sugi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 365 days.

(21) Appl. No.: 17/276,538

(22) PCT Filed: Nov. 27, 2018

(86) PCT No.: PCT/JP2018/043515
§ 371 (c)(1),
(2) Date: Mar. 16, 2021

(87) PCT Pub. No.: WO2020/110191
PCT Pub. Date: Jun. 4, 2020

(65) Prior Publication Data
US 2022/0037942 A1 Feb. 3, 2022

(51) Int. Cl.
*H02K 1/27* (2022.01)
*H02K 1/276* (2022.01)
*H02K 29/03* (2006.01)

(52) U.S. Cl.
CPC ........... *H02K 1/2766* (2013.01); *H02K 29/03* (2013.01); *H02K 2213/03* (2013.01)

(58) Field of Classification Search
CPC .. H02K 1/2766; H02K 29/03; H02K 2213/03; H02K 1/276
See application file for complete search history.

(56) References Cited

U.S. PATENT DOCUMENTS

| 5,679,995 A | 10/1997 | Nagate et al. | |
|---|---|---|---|
| 2004/0256940 A1* | 12/2004 | Tsuruta | H02K 1/276 |
| | | | 310/216.069 |

(Continued)

FOREIGN PATENT DOCUMENTS

| EP | 3 010 126 A2 | 4/2016 |
|---|---|---|
| JP | 2007-089291 A | 4/2007 |

(Continued)

OTHER PUBLICATIONS

Notice of Reasons for Refusal dated Jan. 18, 2022 from the Japanese Patent Office in JP Application No. 2020-557429.

(Continued)

*Primary Examiner* — Thomas Truong
(74) *Attorney, Agent, or Firm* — Sughrue Mion, PLLC; Richard C. Turner

(57) ABSTRACT

A rotor core of a rotating electrical machine has interpole bridges each disposed on an outer circumferential side with respect to a permanent magnet in a non-magnetic portion between the poles, and interpole diameter bridges each surrounded by two permanent magnets and an interpole bridge. The outer circumferential surface of each interpole bridge is formed by a first flat surface. Thus, a path of a magnetic flux passing through a magnetic gap is lengthened, so that a q-axis inductance is reduced. In addition, a width in a radial direction of each interpole bridge and a width in a circumferential direction of each interpole diameter bridge are constant, and each interpole bridge and each interpole diameter bridge are disposed so as to be perpendicular to each other to form a T shape. Thus, the concentration of stress during press-fitting of the permanent magnet into a magnet hole can be reduced.

14 Claims, 15 Drawing Sheets

(56) References Cited

U.S. PATENT DOCUMENTS

| | | | |
|---|---|---|---|
| 2007/0063607 A1 | 3/2007 | Hattori | |
| 2009/0115279 A1* | 5/2009 | Spaggiari | H02K 29/03 |
| | | | 310/156.53 |
| 2010/0166575 A1* | 7/2010 | Fukuda | H02K 1/276 |
| | | | 310/216.106 |
| 2013/0002082 A1* | 1/2013 | Utsumi | H02K 1/2746 |
| | | | 29/598 |
| 2013/0113325 A1* | 5/2013 | Saito | H02K 1/2766 |
| | | | 310/156.12 |
| 2014/0232230 A1 | 8/2014 | Yabe et al. | |
| 2014/0368081 A1 | 12/2014 | Yabe et al. | |
| 2016/0111924 A1* | 4/2016 | Tsuzuki | H02K 29/03 |
| | | | 310/216.092 |
| 2017/0104376 A1 | 4/2017 | Nakagawa et al. | |
| 2020/0127509 A1* | 4/2020 | Takizawa | H02K 21/14 |

FOREIGN PATENT DOCUMENTS

| | | |
|---|---|---|
| JP | 2007-295708 A | 11/2007 |
| JP | 2012-105410 A | 5/2012 |
| JP | 5762569 B2 | 8/2015 |
| JP | 5805191 B2 | 11/2015 |
| WO | 2007/004009 A2 | 1/2007 |

OTHER PUBLICATIONS

International Search Report for PCT/JP2018/043515 dated Feb. 26, 2019.
Extended European Search Report dated Nov. 3, 2021 in Application No. 18941297.6.
Notification of Reasons for Refusal dated May 20, 2023 from the Chinese Patent Office in Application No. 201880099515.8.
Chinese Office Action dated Sep. 16, 2023 in Chinese Application No. 201880099515.8.

* cited by examiner

ROTATING ELECTRICAL MACHINE

CROSS-REFERENCE TO RELATED APPLICATIONS

This application is a National Stage of International Application No. PCT/JP2018/043515 filed Nov. 27, 2018.

TECHNICAL FIELD

The present disclosure relates to a rotating electrical machine and particularly relates to the structure of a rotor core.

BACKGROUND ART

As a rotating electrical machine used for a vehicle electric power steering device or an industrial electric motor, etc., there is a machine in which three-phase currents are applied from an inverter to coils wound around a plurality of tooth portions formed in a stator core. As such a rotating electrical machine, a machine including a rotor rotatably held on the inner circumferential side of a stator core with a magnetic gap therebetween, is known. The rotor core is provided with a plurality of magnet holes in the circumferential direction, and permanent magnets for forming magnetic poles are embedded in the rotor core.

As for the permanent magnet embedded rotating electrical machine described above, a technology is known in which the outer circumferential surface, facing a magnetic gap of each magnetic pole, of the rotor core is formed with an arc-shaped petal structure, thereby causing the waveform in the circumferential direction of the magnetic flux density in the magnetic gap to be closer to a sine wave to suppress torque pulsation. For example, Patent Document 1 discloses a permanent magnet embedded motor that has: six arc-shaped division outer circumferential surfaces each including a first arc surface and a second arc surface; and recesses at non-magnetic portions between the six division outer circumferential surfaces (between poles).

Meanwhile, by forming the outer circumferential surface of the rotor core with the petal structure, the distance between each magnet and the magnetic gap is increased, so that torque is decreased, which is a problem. In addition, in Patent Document 1, the width in the circumferential direction of each magnet is limited by the depth of each recess between the poles, so that it is difficult to further increase magnetic force. For solving such problems, Patent Document 2 and Patent Document 3 propose forming an outer circumferential surface, facing the magnetic gap, between poles of a rotor core in an arc shape. By forming the outer circumferential surface between the poles in an arc shape, it is possible to dispose each magnet at a position closer to a magnetic gap and it is also possible to increase the width in the circumferential direction of each magnet, thereby achieving improvement of torque.

CITATION LIST

Patent Document

Patent Document 1: Japanese Laid-Open Patent Publication No. 2007-295708
Patent Document 2: Japanese Patent No. 5762569
Patent Document 3: Japanese Patent No. 5805191

SUMMARY OF THE INVENTION

Problems to be Solved by the Invention

However, in the case where the outer circumferential surface between the poles of the rotor core is formed in an arc shape, the path of a magnetic flux passing through the magnetic gap becomes short, so that the magnetic resistance between the portion between the poles and the stator is decreased. Accordingly, the amount of magnetic flux and the inductance (hereinafter, referred to as q-axis inductance) in a magnetic path (q axis) connecting the portion between the poles and the stator increases. As a result, when the rotating electrical machine rotates at high speed, the impedance component due to inductance increases, so that a terminal voltage is increased.

Meanwhile, the rotating electrical machine becomes a generator when the terminal voltage exceeds a power supply voltage, and does not generate torque. Therefore, it is necessary to perform control so as to decrease the rotation speed such that the terminal voltage does not exceed the power supply voltage. That is, when the q-axis inductance increases, the rotation speed-torque characteristics of the rotating electrical machine decrease, so that the operable range is reduced, which is a problem. In particular, in the case where the rotating electrical machine is used as an electric motor for an electric power steering device, a high torque output at high-speed rotation is required during stationary steering at the time of parking or stopping. Therefore, the electric motor is required to have a wide operable range in the rotation speed-torque characteristics thereof, and reduction of the operable range leads to deterioration of the performance of the electric power steering device.

The present disclosure has been made to solve the above problems, and an object of the present disclosure is to achieve reduction of torque pulsation and improvement of torque of a rotating electrical machine, and reduce a q-axis inductance to improve high-speed rotation characteristics in rotation speed-torque characteristics.

Solution to the Problems

A rotating electrical machine according to the present disclosure is a rotating electrical machine including: a rotor having a rotor core provided with a plurality of magnet holes in a circumferential direction, and permanent magnets embedded in the magnet holes and forming magnetic poles; and a stator having a plurality of tooth portions which are disposed in the circumferential direction and on which coils are wound, wherein the rotor is disposed on an inner circumferential side of the stator with a magnetic gap therebetween, an outer circumferential portion of the rotor core has petal portions disposed so as to correspond to the respective magnetic poles and each having an arc shape with a diameter smaller than a rotor diameter, and interpole bridges each located at a non-magnetic portion between the adjacent magnetic poles and disposed on an outer circumferential side with respect to the permanent magnets, and the interpole bridges each have an outer circumferential surface facing the magnetic gap and formed by at least one flat surface.

Effect of the Invention

In the rotating electrical machine according to the present disclosure, since the outer circumferential surface, of each interpole bridge, which faces the magnetic gap is formed by a flat surface, a path of a magnetic flux passing through the magnetic gap is longer than that in the case where the outer circumferential surface of each non-magnetic portion is formed by a curved surface having an arc shape, so that the magnetic resistance of the path of the magnetic flux is increased. Accordingly, a q-axis inductance is reduced, so that high-speed rotation characteristics in rotation speed-torque characteristics can be improved.

Objects, features, aspects, and effects of the present disclosure other than the above will become more apparent from the following detailed description with reference to the drawings.

DESCRIPTION OF EMBODIMENTS

Embodiment 1

Figure 1:
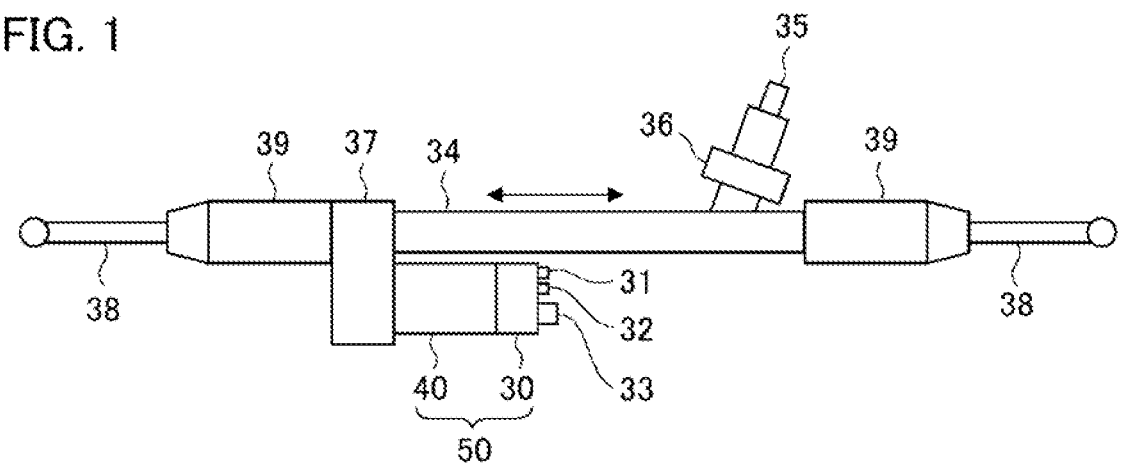
FIG. 1 is a configuration diagram of a vehicle electric power steering device equipped with an electric motor according to Embodiment 1.
Figure 2:
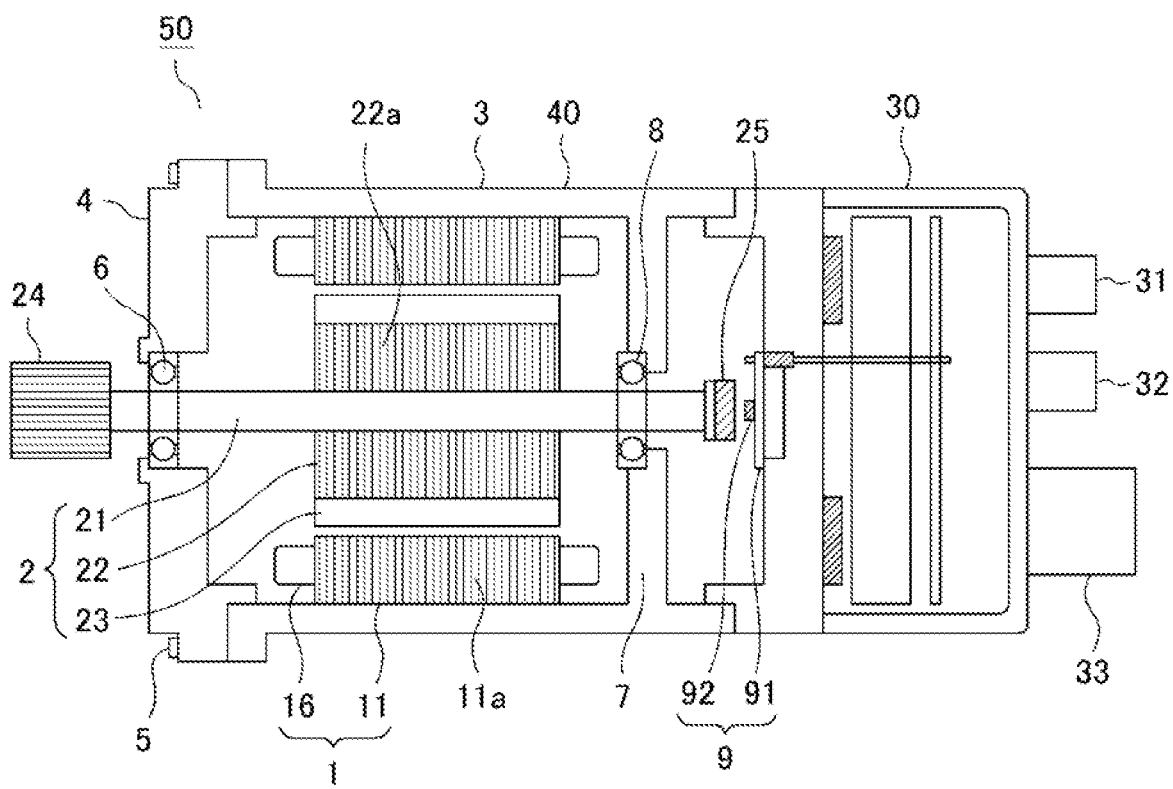
FIG. 2 is a cross-sectional view showing an electric driving device according to Embodiment 1.
Figure 3:
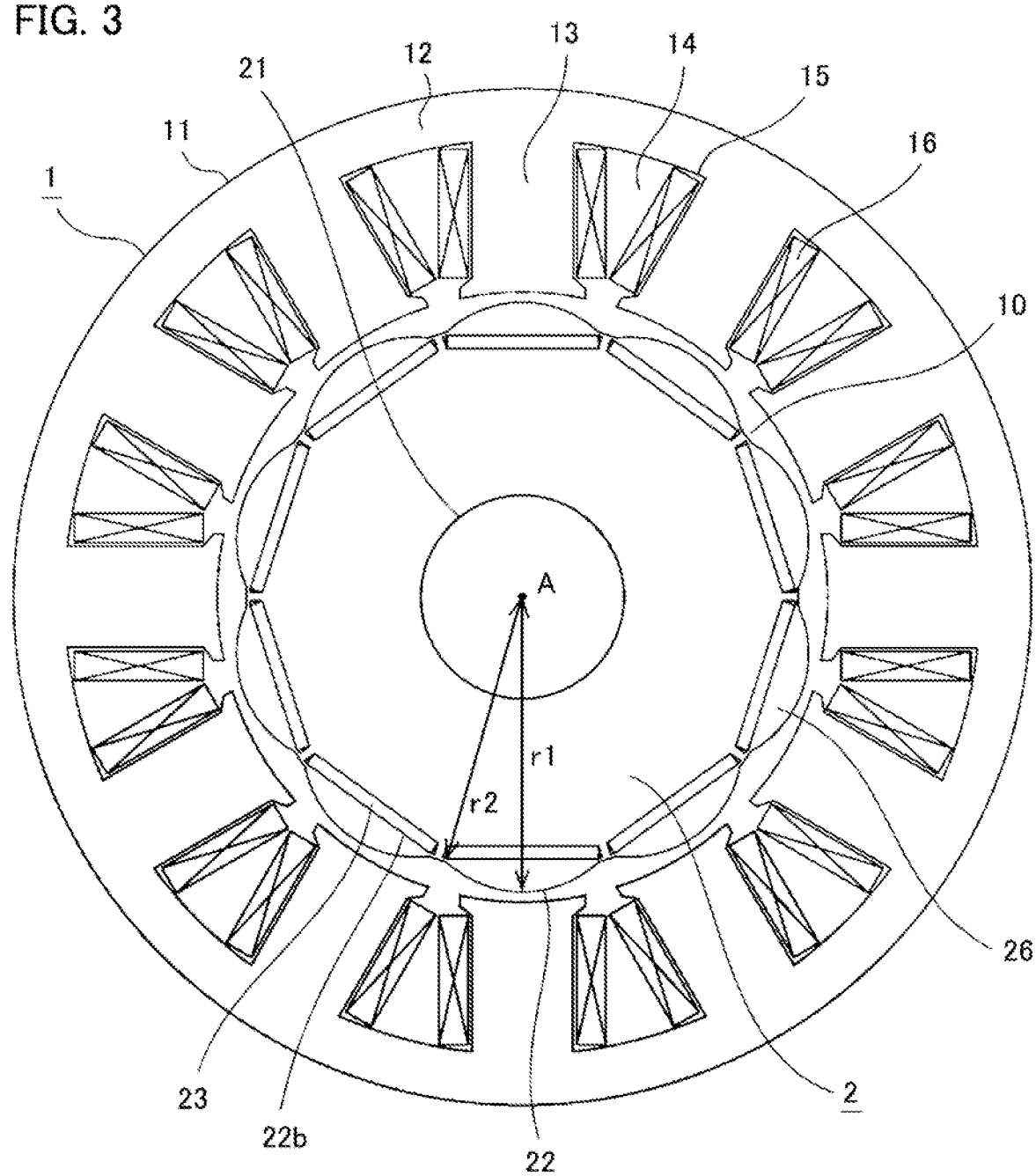
FIG. 3 is a cross-sectional view showing the rotating electrical machine according to Embodiment 1.
Figure 4:
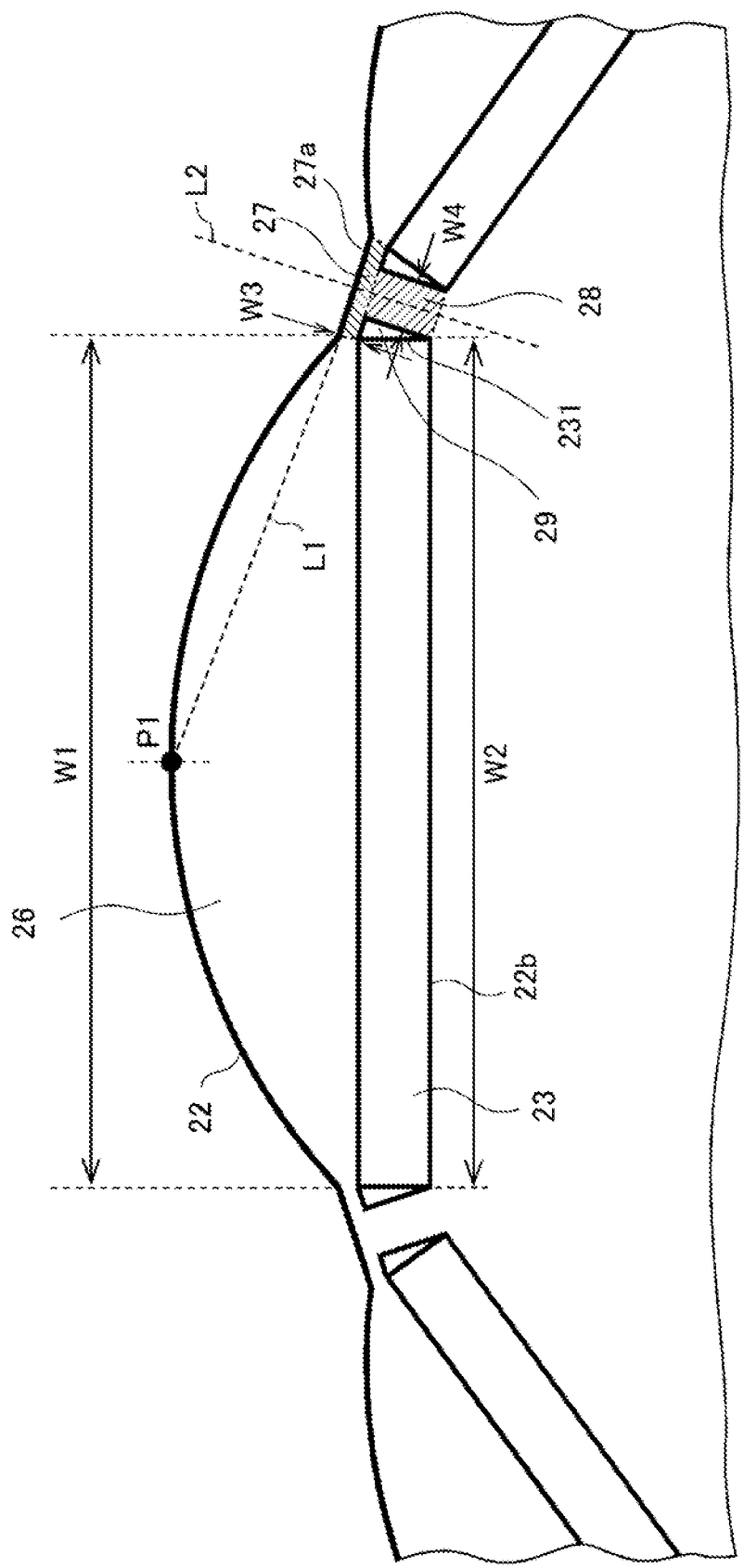
FIG. 4 is a partially enlarged cross-sectional view showing the rotating electrical machine according to Embodiment 1.

Hereinafter, a rotating electrical machine according to Embodiment 1 will be described with reference to the drawings. FIG. 1 is a configuration diagram of a vehicle electric power steering device equipped with the electric motor according to Embodiment 1, FIG. 2 is a cross-sectional view showing an electric driving device of the electric power steering device shown in FIG. 1, and FIG. 3 and FIG. 4 are a cross-sectional view and a partially enlarged cross-sectional view, respectively, showing the rotating electrical machine according to Embodiment 1. In the drawings, identical and corresponding portions are designated by the same reference characters.

As shown in FIG. 1, the electric driving device 50 for the electric power steering device includes an ECU (Engine Control Unit) 30 and an electric motor 40 that is the rotating electrical machine according to Embodiment 1. The electric motor 40 is disposed so as to be parallel to a housing 34 of the electric power steering device. The ECU 30 has a first connector 31, a second connector 32, and a power supply connector 33. Power is supplied from a battery or alternator to the ECU 30 via the power supply connector 33.

A driver steers a steering wheel (not shown), and the torque thereof is transmitted to a shaft 35 via a steering shaft (not shown). At this time, the torque detected by a torque sensor 36 is converted into an electric signal, and the electric signal is transmitted to the ECU 30 via a cable and the first connector 31. Meanwhile, automobile information such as vehicle speed is converted into an electric signal, and the electric signal is transmitted to the ECU 30 via the second connector 32. The ECU 30 calculates a required assist torque on the basis of the torque and the automobile information such as vehicle speed, and supplies a current to the electric motor 40 through an inverter.

The torque generated by the electric motor 40 generates a thrust force that moves a rack shaft within the housing 34 in the axial direction (the direction of an arrow in FIG. 1), via a gearbox 37 in which a belt and a ball screw are provided. Accordingly, a tie rod 38 moves, and tires are steered to turn the vehicle. As a result, the driver is assisted by the torque of the electric motor 40 and can turn the vehicle with less steering force. A rack boot 39 prevents foreign matter from entering the device.

As shown in FIG. 2, the electric motor 40 includes a stator 1, a rotor 2 rotatably provided inside the stator 1, a cylindrical frame 3 having an inner wall surface to which the stator 1 is fixed, and a housing 4 covering an opening on one side of the frame 3. The housing 4 is fixed to the frame 3 by a plurality of bolts 5.

The stator 1 has a stator core 11 formed by stacking a plurality of magnetic core sheets 11a in the axial direction, and armature windings housed in the stator core 11. As shown in FIG. 3, the stator core 11 has an annular core back 12 and a plurality of (here, 12) tooth portions 13 projecting radially inward from the core back 12. A slot 14 is formed between adjacent tooth portions 13, and coils 16 are housed in each slot 14. The armature windings are composed of the coils 16 wound around the tooth portions 13 with insulators 15 therebetween.

The rotor 2 is disposed on the inner circumferential side of the stator 1 with a magnetic gap 10 therebetween. As shown in FIG. 2, the rotor 2 includes a shaft 21 that is a rotary shaft, a rotor core 22 formed by stacking a plurality of magnetic core sheets 22a in the axial direction, and permanent magnets 23. A pulley 24 is fixed to one end portion of the shaft 21, and a sensor permanent magnet 25 is fixed to another end portion of the shaft 21. The core sheets 11a and 22a are, for example, electromagnetic steel sheets. The shaft 21 is supported at both ends thereof by a first bearing 6 fitted to the housing 4 and a second bearing 8 fitted to a wall portion 7. A magnetic sensor 92 that is a rotation angle sensor is provided on a substrate 91 of a sensor unit 9 and faces the sensor permanent magnet 25.

The rotor core 22 is provided with a plurality of (here, 10) magnet holes 22b at equal intervals in the circumferential direction, and the permanent magnets 23 are embedded in the respective magnet holes 22b to form magnetic poles. The permanent magnets 23 are each a rectangular parallelepiped having a rectangular cross-sectional shape perpendicular to the axial direction. The permanent magnets 23 are each obtained by processing a rare earth element containing neodymium, iron, or boron as a main component into a flat plate shape, and both surfaces thereof are magnetized to be an N pole and an S pole, respectively. The permanent magnets 23 are disposed in the respective magnet holes 22b such that the N pole surfaces and the S pole surfaces thereof alternate with each other, to form the rotor 2. In the following description, the width in the circumferential direction of each permanent magnet 23 is defined as the width in the circumferential direction of the magnetic pole.

Next, the configuration of an outer circumferential portion of the rotor core 22 will be described in detail. As shown in FIG. 3 and FIG. 4, the outer circumferential portion of the rotor core 22 according to Embodiment 1 has arc-shaped petal portions 26 disposed so as to correspond to the respective magnetic poles, and interpole bridges 27 each disposed on the outer circumferential side of the permanent magnet 23 in a non-magnetic portion between adjacent magnetic poles (hereinafter, referred to as between poles).

As shown in FIG. 4, the outer circumferential surface, of each interpole bridge 27, which faces the magnetic gap 10 is formed by one flat surface (first flat surface 27a). The interpole bridges 27 each have a substantially rectangular cross-sectional shape perpendicular to the axial direction, and the outer circumferential surface thereof has a linear shape. Furthermore, a width W3 in the radial direction of each interpole bridge 27 is constant. Moreover, in Embodiment 1, in a cross-section perpendicular to the axial direction, a virtual straight line L1 obtained by extending the first flat surface 27a intersects a central portion P1 in the circumferential direction of the petal portion 26. However, the shape of each interpole bridge 27 is not limited thereto, and the case where the virtual straight line obtained by extending the first flat surface 27a does not intersect the central portion P1 in the circumferential direction of the petal portion 26 is also included.

Moreover, the rotor core 22 has interpole diameter bridges 28 each disposed between two permanent magnets 28 forming adjacent magnetic poles. Each interpole diameter bridge 28 is located in a non-magnetic portion surrounded by two permanent magnets 23 and an interpole bridge 27, and a width W4 in the circumferential direction thereof is constant. A center line L2 in the circumferential direction of the interpole diameter bridge 28 coincides with a center line in the circumferential direction between the poles. Each interpole bridge 27 and each interpole diameter bridge 28 are disposed so as to be perpendicular to each other, so that a cross-sectional shape thereof perpendicular to the axial direction is a T shape. Each of the widths W3 in the radial direction of the interpole bridges 27 and the widths W4 in the circumferential direction of the interpole diameter bridges 28 is larger than the thickness in the axial direction of each core sheet 22a.

Each petal portion 26 has an arc shape with a diameter smaller than the rotor diameter, and the central portion P1 in the circumferential direction of the petal portion 26 coincides with the center of the width W2 in the circumferential direction of the permanent magnet 23. As shown in FIG. 3, each petal portion 26 has a maximum distance r1 from an axis A of the rotor 2 at the central portion in the circumferential direction thereof, and has a minimum distance r2 from the axis A of the rotor 2 at both ends in the circumferential direction thereof. A width W1 in the circumferential direction of the petal portion 26 is equal to or smaller than the width W2 in the circumferential direction of the permanent magnet 23 (W1 W2), and is equal to the width W2 in the circumferential direction of the permanent magnet 23 (W1=W2) in Embodiment 1.

Moreover, in each of regions surrounded by the interpole bridges 27, the interpole diameter bridges 28, and end faces 231 in the circumferential direction of the permanent magnets 23, the rotor core 22 includes a flux barrier 29 for blocking a leakage magnetic flux of the permanent magnet 23. The flux barrier 29 is an air layer provided inside the core sheets 22a. In order not to block a magnetic flux that flows from each permanent magnet 23 through the magnetic gap 10 to the stator 1 (that is, a magnetic flux that contributes to torque), the flux barrier 29 is not provided between each permanent magnet 23 and the magnetic gap 10.

The leakage magnetic flux that returns to the permanent magnet 23 through the interpole bridge 27 and the interpole diameter bridge 28 does not contribute to the output torque of the electric motor and thus is blocked by the flux barrier 29. By having the flux barrier 29, it is possible to dispose each permanent magnet 23 at a position closer to the magnetic gap 10. The corners of the flux barrier 29 may be provided with C chamfers or R chamfers for improving the manufacturability.

Figure 5:
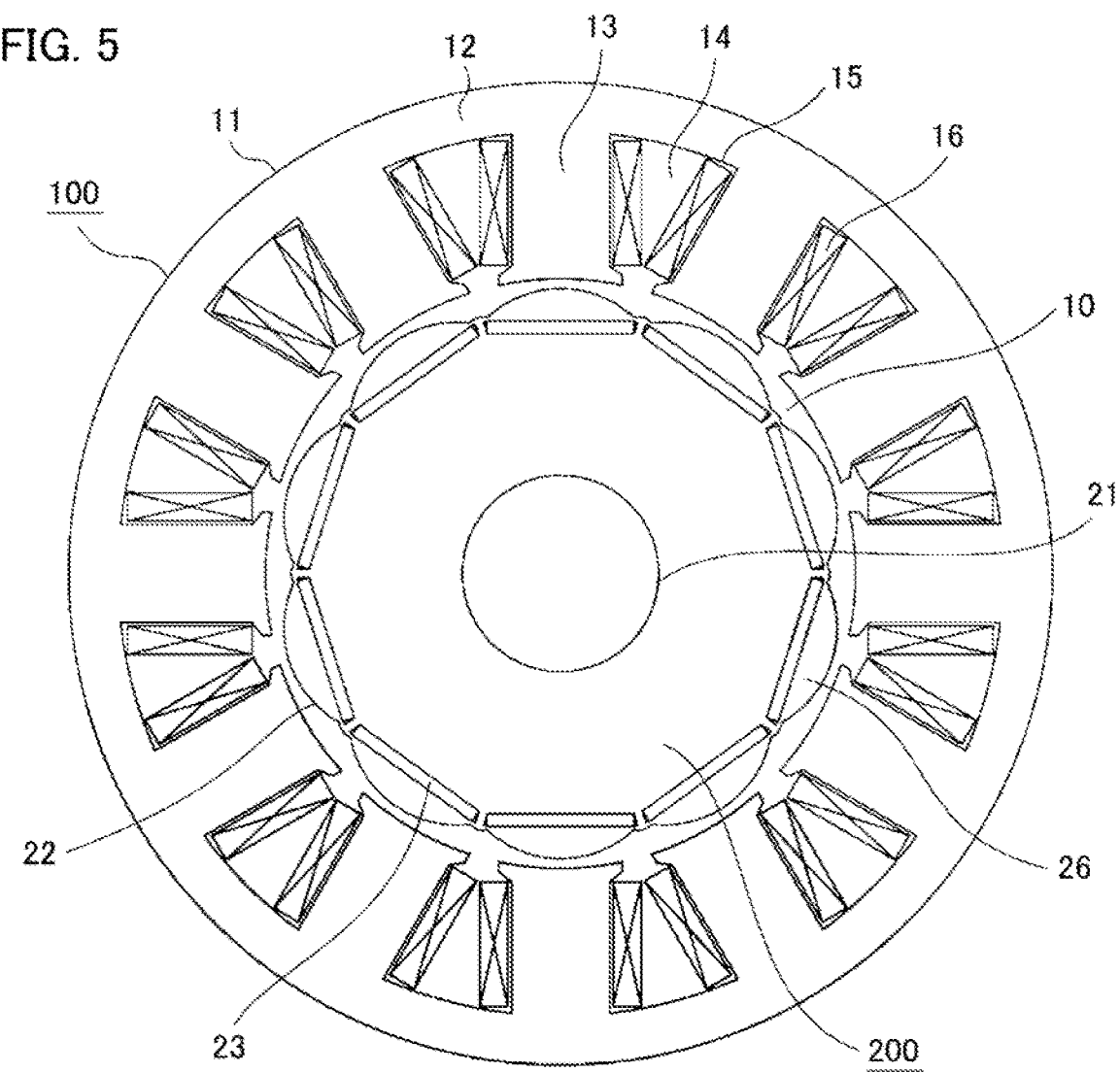
FIG. 5 is a cross-sectional view showing a comparative example for the rotating electrical machine according to Embodiment 1.
Figure 6:
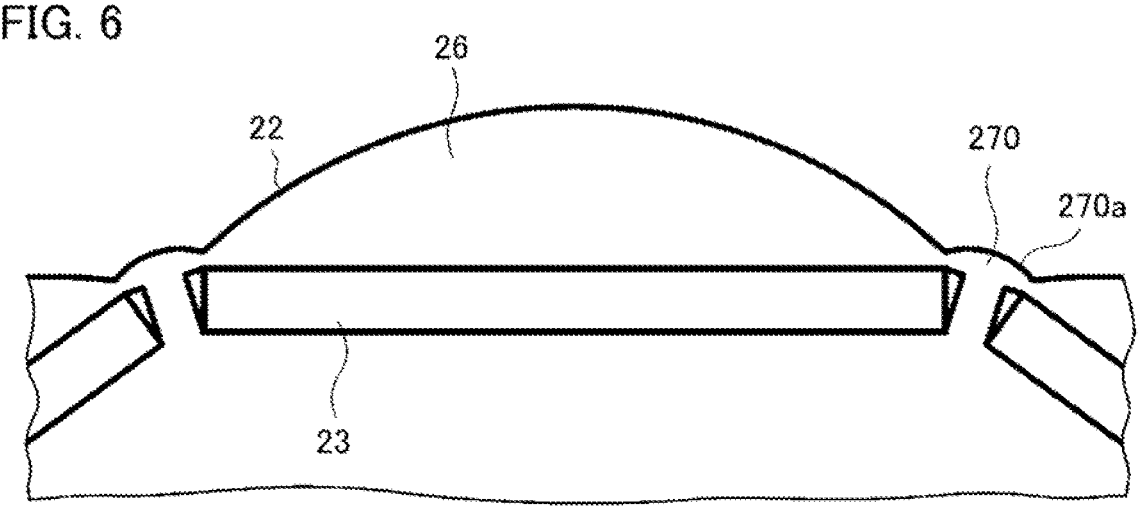
FIG. 6 is a partially enlarged cross-sectional view showing the comparative example for the rotating electrical machine according to Embodiment 1.

FIG. 5 and FIG. 6 are a cross-sectional view and a partially enlarged cross-sectional view, respectively, showing a comparative example for the rotating electrical machine according to Embodiment 1. A rotor 200 according to the comparative example is disposed on the inner circumferential side of a stator 100 with a magnetic gap 10 therebetween. In the comparative example, an outer circumferential portion of the rotor core 22 has arc-shaped petal portions 26 disposed so as to correspond to the respective magnetic poles, and interpole bridges 270 each disposed between poles. The outer circumferential surface of each interpole bridge 270 is formed by one curved surface 270a. That is, the outer circumferential surface of each interpole bridge 270 has an arc cross-sectional shape perpendicular to the axial direction. The configuration of the stator 100 according to the comparative example is the same as that of the stator 1 according to Embodiment 1, and thus the description thereof is omitted.

Figure 7A:
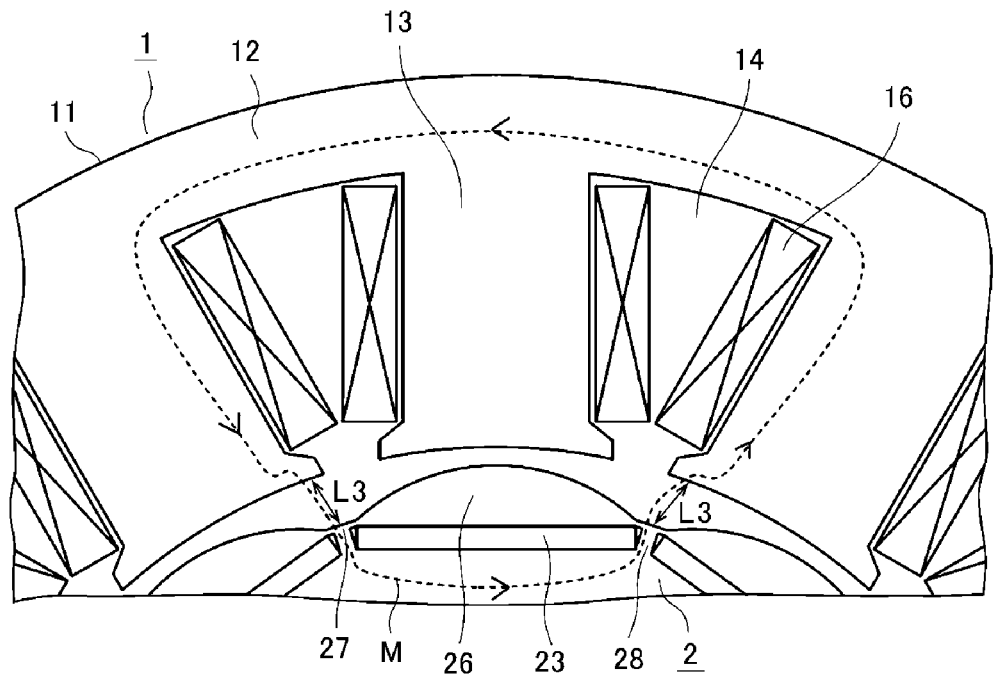
FIG. 7A shows diagrams illustrating a path of a magnetic flux of the rotating electrical machine according to Embodiment 1 and FIG. 7B shows diagram illustrating a path of a magnetic flux of the rotating electrical machine according to the comparative example.
Figure 7B:
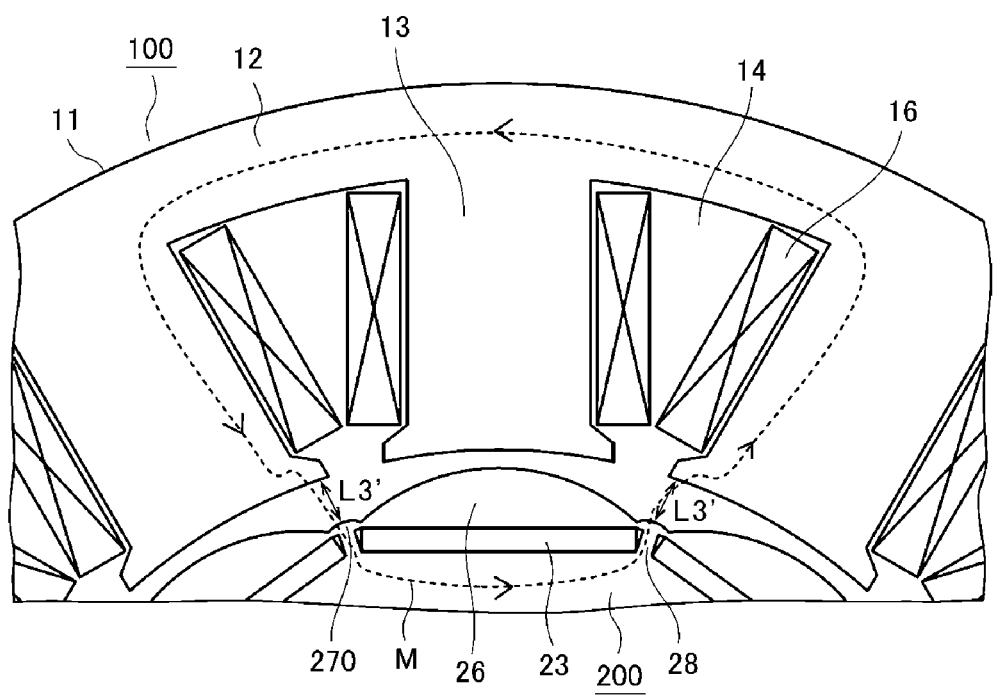

The operation and effects of the rotating electrical machine according to Embodiment 1 will be described with reference to FIG. 7A and FIG. 7B. FIG. 7A is a diagram illustrating the path of a magnetic flux of the rotating electrical machine according to Embodiment 1, and FIG. 7B is a diagram illustrating the path of a magnetic flux of the rotating electrical machine according to the comparative example. In each drawing, a dotted line shown by M indicates the path of the magnetic flux.

Generally, as for an electric motor, in order to apply a current in the positive direction from a power supply to windings to generate a desired torque, it is necessary to design the electric motor such that a terminal voltage is smaller than a power supply voltage. Meanwhile, the terminal voltage increases with the product of a q-axis inductance and a rotation speed, and thus the upper limit of the rotation speed decreases when the q-axis inductance increases. As described above, a decrease in the upper limit of the rotation speed causes a decrease in the speed-torque characteristics of the electric motor, resulting in reduction of the operable range of the electric motor. Therefore, it is desirable to suppress an increase in the q-axis inductance especially in applications such as electric power steering devices that require a wide operable range.

In the case of the rotating electrical machine according to Embodiment 1, as shown in FIG. 7A, the magnetic flux passes through the interpole diameter bridges 28 and the interpole bridges 27 and further through the magnetic gap 10. Since the outer circumferential surface of each interpole bridge 27 facing the magnetic gap 10 is formed by the first flat surface 27a, a length L3 of the path of the magnetic flux passing through the magnetic gap 10 is longer than a length L3' of the path of the magnetic flux in the comparative example shown in the FIG. 7B (L3>L3'). Thus, as compared to the comparative example, the magnetic resistance of the path of the magnetic flux is increased, so that the flow quantity of the magnetic flux is reduced, and the q-axis inductance is reduced. Accordingly, it is possible to reduce the terminal voltage and improve the upper limit of the rotation speed.

Moreover, by the petal portions 26 disposed so as to correspond to the respective magnetic poles, the waveform of the magnetic flux density in the magnetic gap 10 can be made closer to a sine wave, so that torque pulsation can be suppressed. Furthermore, by disposing the interpole bridges 27 between the adjacent petal portions 26, the permanent magnets 23 can be made closer to the magnetic gap 10, so that torque can be improved.

The width W3 in the radial direction of each interpole bridge 27 and the width W4 in the circumferential direction of each interpole diameter bridge 28 are desirably as small as possible. Accordingly, the magnetic resistance of the path of a leakage magnetic flux is increased, and the amount of the leakage magnetic flux is reduced, so that torque is improved. However, if W3 and W4 are excessively decreased, the strength of the rotor core 22 cannot be ensured, so that the manufacturability is reduced. Therefore, W3 and W4 are set to values larger than the thickness in the axial direction of each core sheet 22a forming the rotor core 22. Accordingly, it is possible to achieve both improvement of the manufacturability of the core sheets 22a by punching an electromagnetic steel sheet and improvement of torque by a reduction in leakage magnetic flux.

Figure 8:
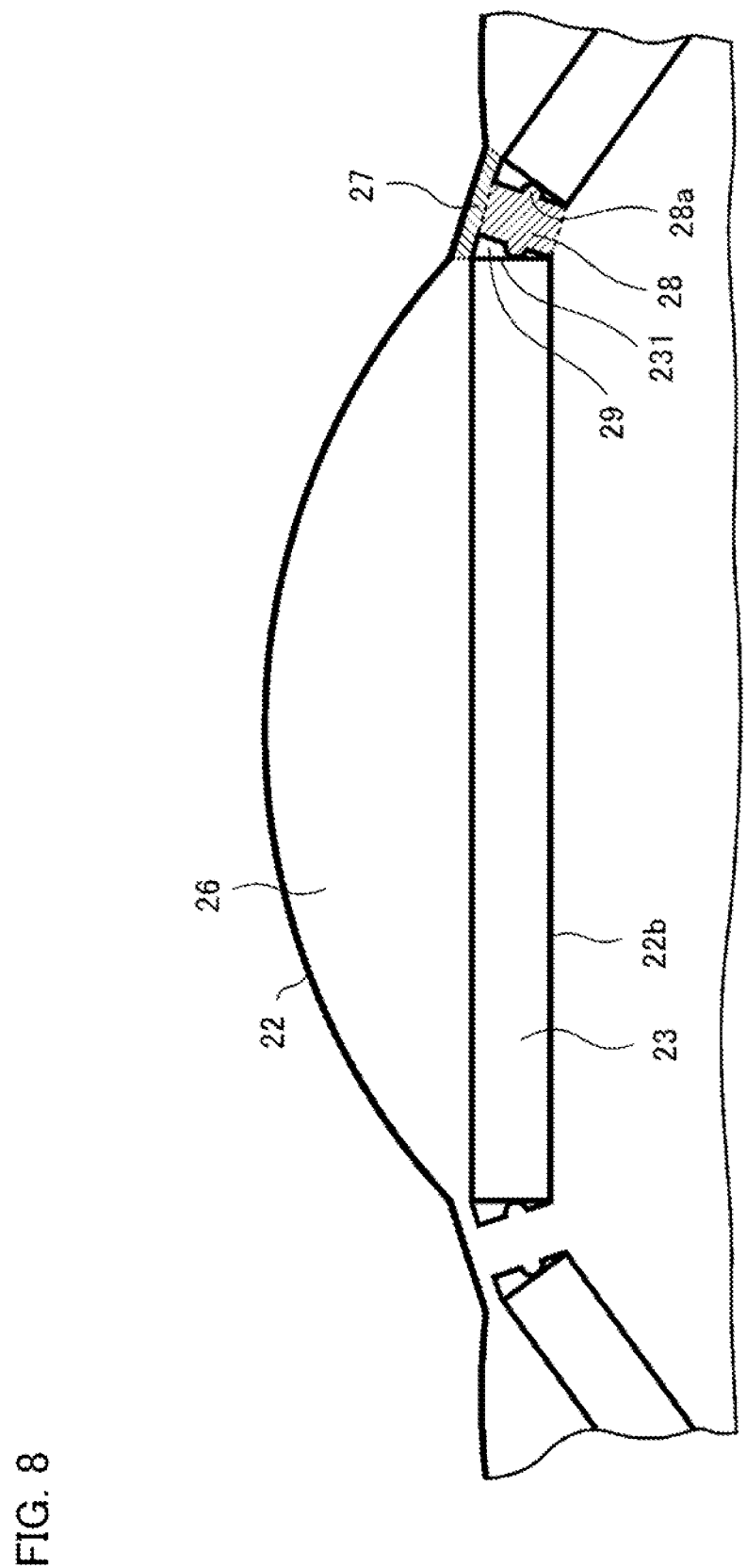
FIG. 8 is a partially enlarged cross-sectional view showing a modification of the rotating electrical machine according to Embodiment 1.

FIG. 8 is a partially enlarged cross-sectional view showing a modification of the rotating electrical machine according to Embodiment 1. As in this modification, projections 28a may be provided to the interpole diameter bridges 28 so as to project in the circumferential direction, and may be in contact with the end faces 231 in the circumferential direction of the permanent magnets 23. Accordingly, positional displacement in the circumferential direction of the permanent magnets 23 can be suppressed. The positions of the projections 28a may be any positions as long as the permanent magnets 28 can be held, and the projections 28a may be provided to the interpole bridges 27 or the magnet holes 22b.

During the manufacture of the rotor core 22, the stress generated during press-fitting of each permanent magnet 23 into the magnet hole 22b is increased particularly at a portion, near the permanent magnet 23, in which the strength of the core sheets 22a is locally low, that is, at the interpole bridges 27 and the interpole diameter bridges 28. Therefore, in Embodiment 1, by causing the width W3 in the radial direction of each interpole bridge 27 and the width W4 in the circumferential direction of each interpole diameter bridge 28 to be constant, the stress applied to the interpole bridges 27 and the interpole diameter bridges 28 is evenly distributed to reduce the concentration of stress on local portions. In addition, by forming each interpole bridge 27 and each interpole diameter bridge 28 in a T shape in which the bridges 27 and 28 are orthogonal to each other, the concentration of stress during press-fitting of the permanent magnet 23 can be further reduced.

Moreover, since each of the interpole bridges 27 and the interpole diameter bridges 28 is formed in a simple linear shape, the manufacture is easy, and the manufacturing cost of the core sheets 22a can be reduced. Furthermore, since the permanent magnets 23, which are rectangular parallelepipeds, are used, mass production of the permanent magnets 23 is possible at low cost by cutting out a base magnet. Since the cost of the permanent magnets 23 accounts for a large proportion of the cost of the rotating electrical machine, the permanent magnets 23 capable of mass production are effective in reducing the cost of the rotating electrical machine.

Due to the above, according to Embodiment 1, it is possible to achieve reduction of torque pulsation and improvement of torque of the rotating electrical machine, and it is also possible to reduce the q-axis inductance to improve the high-speed rotation characteristics in the rotation speed-torque characteristics of the electric motor. Therefore, in the case where the rotating electrical machine according to Embodiment 1 is used as an electric motor for an electric power steering device, the operable range in the rotation speed-torque characteristics becomes wide, so that a high-performance electric power steering device can be obtained.

Embodiment 2

Figure 9:
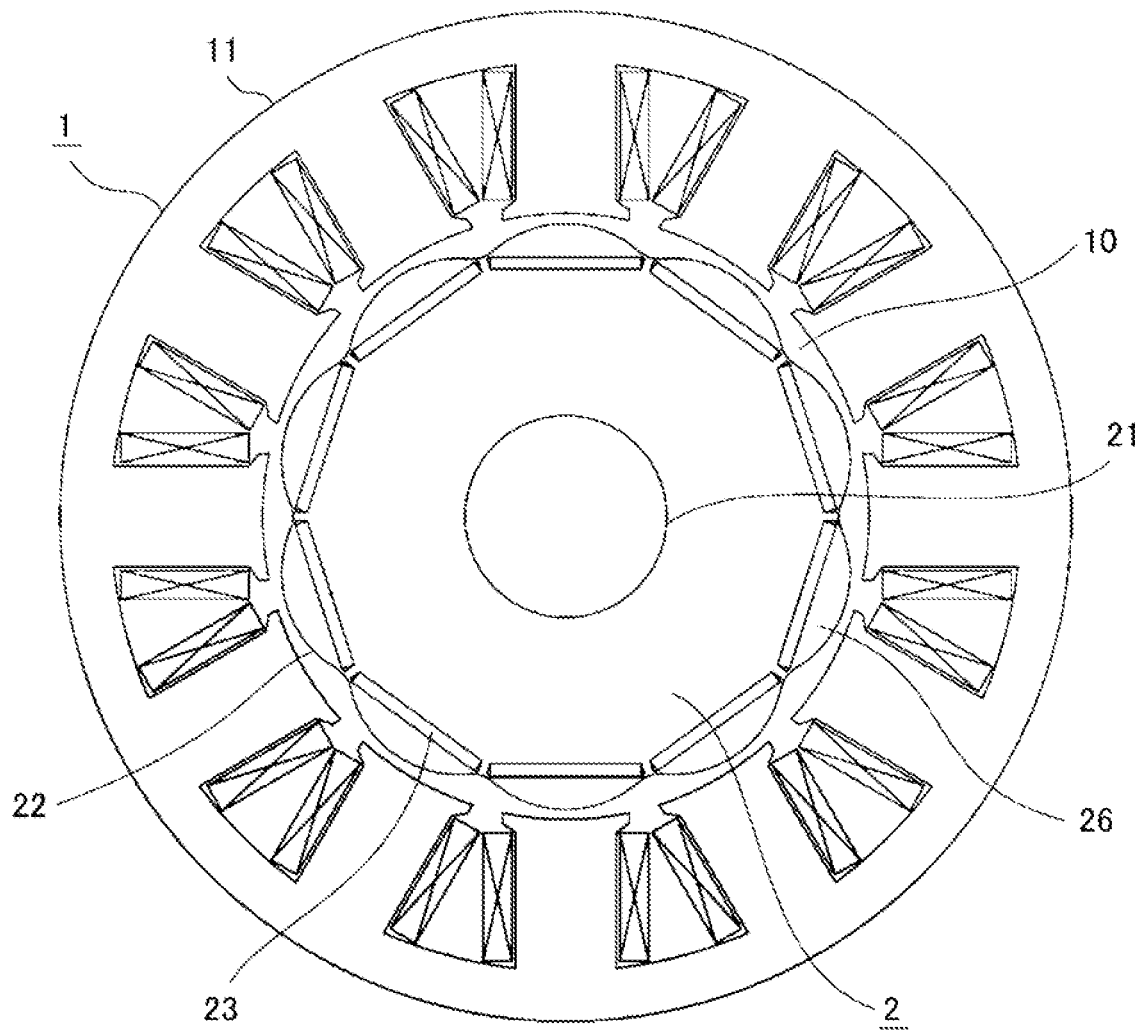
FIG. 9 is a cross-sectional view showing a rotating electrical machine according to Embodiment 2.
Figure 10:
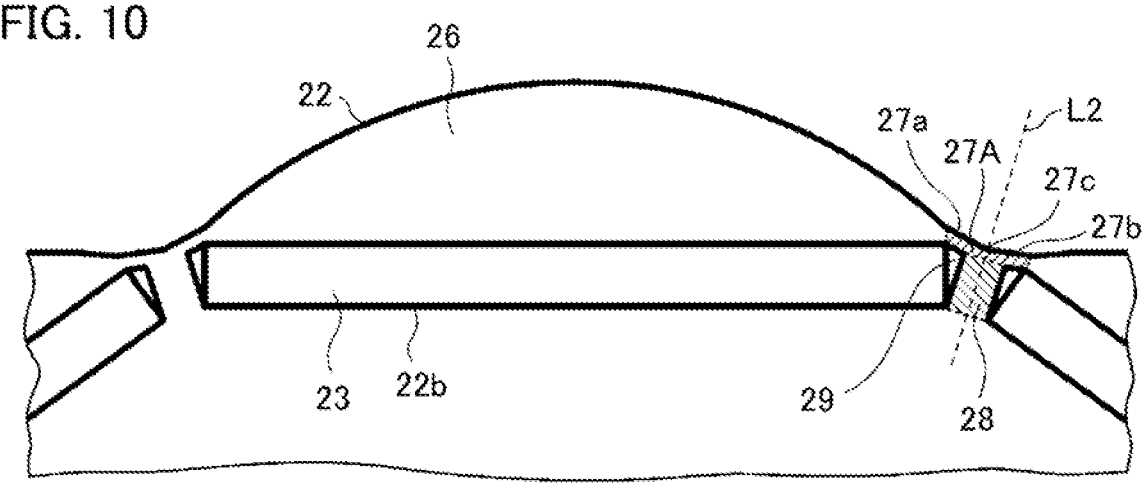
FIG. 10 is a partially enlarged cross-sectional view showing the rotating electrical machine according to Embodiment 2.
Figure 11:
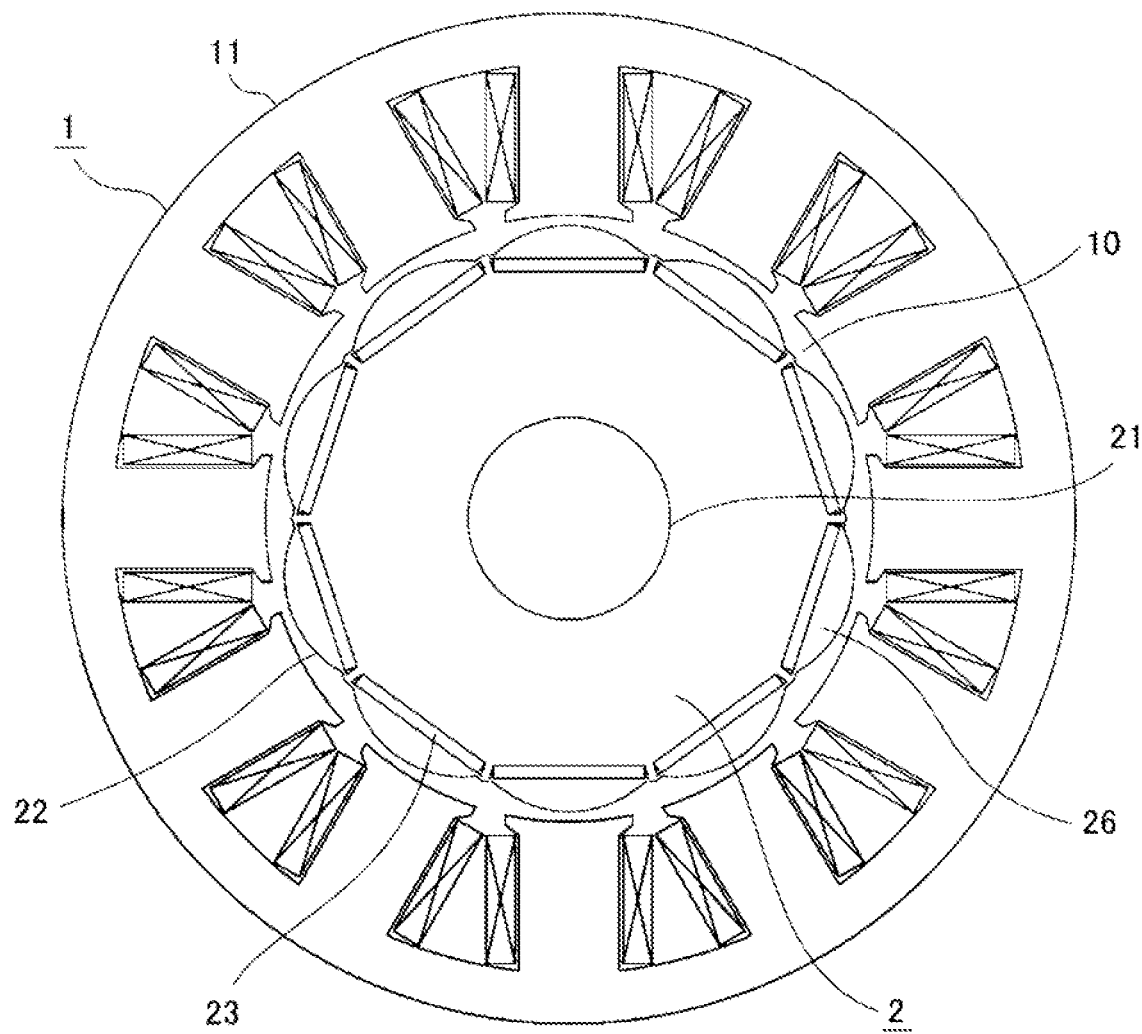
FIG. 11 is a cross-sectional view showing a modification of the rotating electrical machine according to Embodiment 2.
Figure 12:
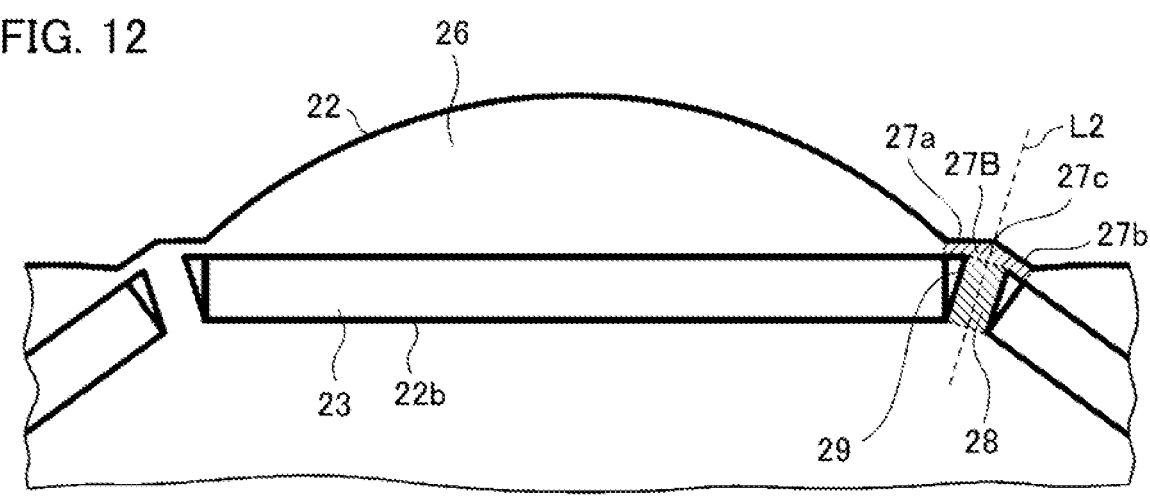
FIG. 12 is a partially enlarged cross-sectional view showing the modification of the rotating electrical machine according to Embodiment 2.

FIG. 9 and FIG. 10 are a cross-sectional view and a partially enlarged cross-sectional view, respectively, showing a rotating electrical machine according to Embodiment 2. FIG. 11 and FIG. 12 are a cross-sectional view and a partially enlarged cross-sectional view, respectively, showing a modification of the rotating electrical machine according to Embodiment 2. In the rotor core 22 of the rotating electrical machine according to Embodiment 1 described above, the outer circumferential surface of each interpole bridge 27 is formed by one flat surface. However, in the rotating electrical machine according to Embodiment 2, the outer circumferential surface of each interpole bridge 27A is formed by two flat surfaces. The other configuration of the rotating electrical machine according to Embodiment 2 is substantially the same as that of Embodiment 1 described above, and thus the description thereof is omitted.

An outer circumferential portion of the rotor core 22 according to Embodiment 2 has arc-shaped petal portions 26 disposed so as to correspond to the respective magnetic poles, and the width in the circumferential direction of each petal portion 26 is equal to the width in the circumferential direction of each permanent magnet 23. In addition, at each non-magnetic portion between the poles, the outer circumferential portion of the rotor core 22 has an interpole bridge 27A disposed on the outer circumferential side with respect to the permanent magnets 23, and the outer circumferential surface of the interpole bridge 27A is formed by a first flat surface 27a and a second flat surface 27b. A connection portion 27c between the first flat surface 27a and the second flat surface 27b is recessed with respect to the magnetic gap 10.

As shown in FIG. 10, the angle on the axial side formed between the first flat surface 27a or the second flat surface 27b, which form the outer circumferential surface of the interpole bridge 27A, and the center line L2 in the circumferential direction of the interpole diameter bridge 28 is larger than 90 degrees. The interpole bridge 27A and the interpole diameter bridge 28 are axisymmetric with respect to the center line L2 in the circumferential direction of the interpole diameter bridge 28, and a cross-sectional shape thereof perpendicular to the axial direction is a Y shape. Accordingly, the length L3 (see FIG. 7A) of the path of the magnetic flux passing through the magnetic gap 10 can be longer than that of Embodiment 1 described above, so that the magnetic resistance of the path of the magnetic flux can be further increased.

In the modification shown in FIG. 11 and FIG. 12, the connection portion 27c between the first flat surface 27a and the second flat surface 27b projects with respect to the magnetic gap 10. Therefore, the angle on the axial side formed between the first flat surface 27a or the second flat surface 27b, which form the outer circumferential surface of an interpole bridge 27B, and the center line L2 in the circumferential direction of the interpole diameter bridge 28 is smaller than 90 degrees. The interpole bridge 27B and the interpole diameter bridge 28 are axisymmetric with respect to the center line L2 in the circumferential direction of the interpole diameter bridge 28, and a cross-sectional shape thereof perpendicular to the axial direction is an arrow shape.

In this modification as well, the length L3 (see FIG. 7A) of the path of the magnetic flux passing through the magnetic gap 10 can be longer than that of the comparative example (see FIG. 7B) in which each portion between the poles has an arc shape, so that the magnetic resistance of the path of the magnetic flux can be increased. The corners of the connection portions 27c of the interpole bridges 27A shown in FIG. 10 or FIG. 12 may be provided with C chamfers and R chamfers for improving the manufacturability, and the same effects are obtained.

According to Embodiment 2, in addition to the same effects as those of Embodiment 1 described above, by having the interpole bridges 27A or 27B each having an outer circumferential surface formed by two flat surfaces, the degree of freedom in the design for lengthening the path of the magnetic flux passing through the magnetic gap 10 is improved, so that the q-axis inductance can be reduced, and the rotation speed-torque characteristics of the electric motor are further improved.

Embodiment 3

Figure 13:
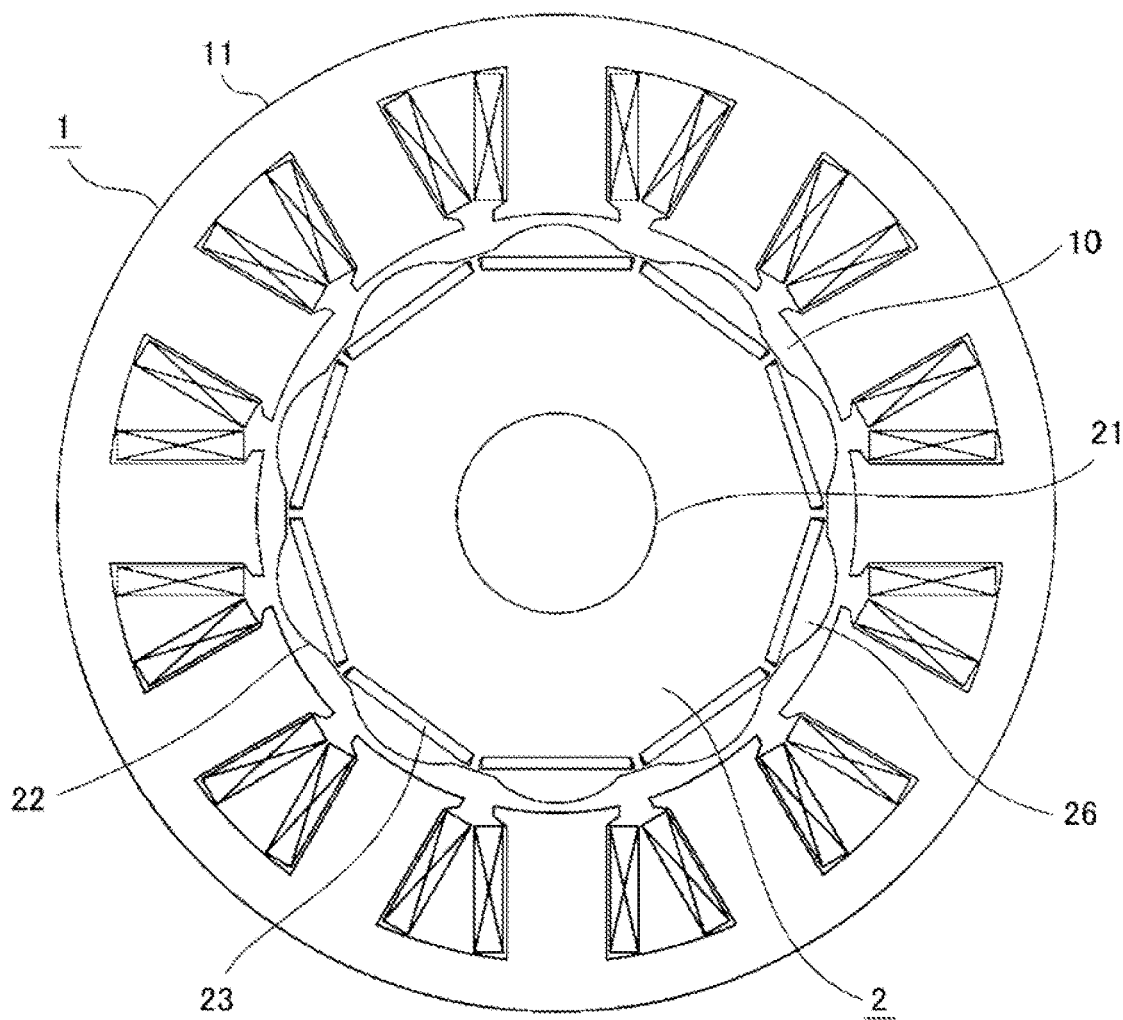
FIG. 13 is a cross-sectional view showing a rotating electrical machine according to Embodiment 3.
Figure 14:
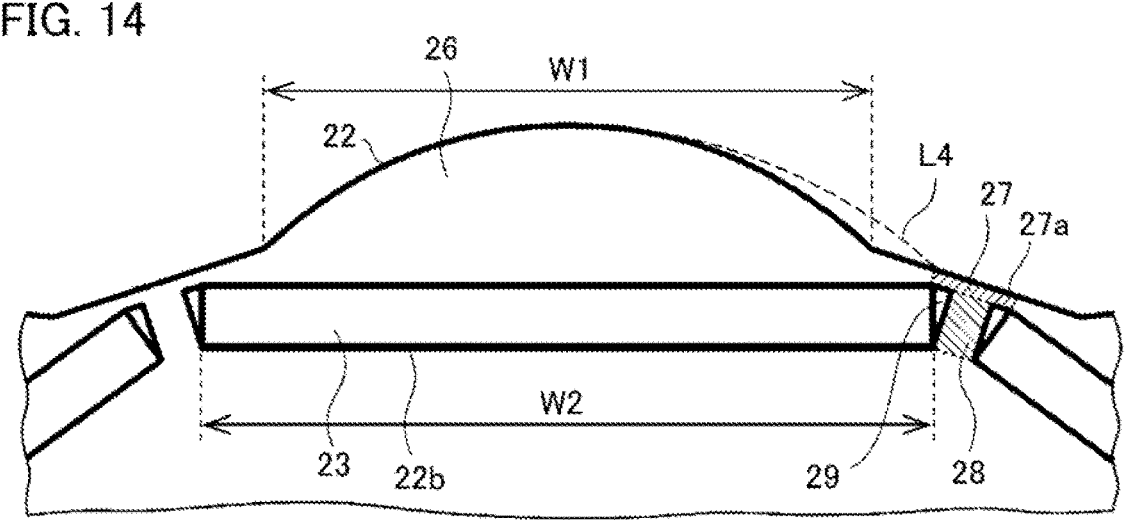
FIG. 14 is a partially enlarged cross-sectional view showing the rotating electrical machine according to Embodiment 3.

FIG. 13 and FIG. 14 are a cross-sectional view and a partially enlarged cross-sectional view, respectively, showing a rotating electrical machine according to Embodiment 3. In the rotating electrical machine according to Embodiment 3, the width W1 in the circumferential direction of each petal portion 26 of the rotor core 22 is made smaller than the width W2 in the circumferential direction of each permanent magnet 23 (W1<W2). The other configuration of the rotating electrical machine according to Embodiment 3 is substantially the same as that of Embodiment 1 or Embodiment 2 described above, and thus the description thereof is omitted.

Each petal portion 26 of the rotor core 22 according to Embodiment 3 has an arc shape with a diameter smaller than that of each petal portion 26 (see FIG. 4) according to Embodiment 1 described above. In FIG. 14, a dotted line L4 indicates a part of the outer shape of the petal portion 26 according to Embodiment 1 described above. In Embodiment 3, the outer circumferential surface of each interpole bridge 27 is formed by a first flat surface 27a, and the outer circumferential surface of each magnetic pole is formed by the outer circumferential surface of the petal portion 26 and a flat surface connected to the first flat surface 27a. By causing the width W1 in the circumferential direction of each petal portion 26 to be smaller than the width W2 in the circumferential direction of each permanent magnet 23 as described above, the distance from the permanent magnet 23 to the magnetic gap 10 can be decreased as compared to Embodiment 1.

Figure 15:
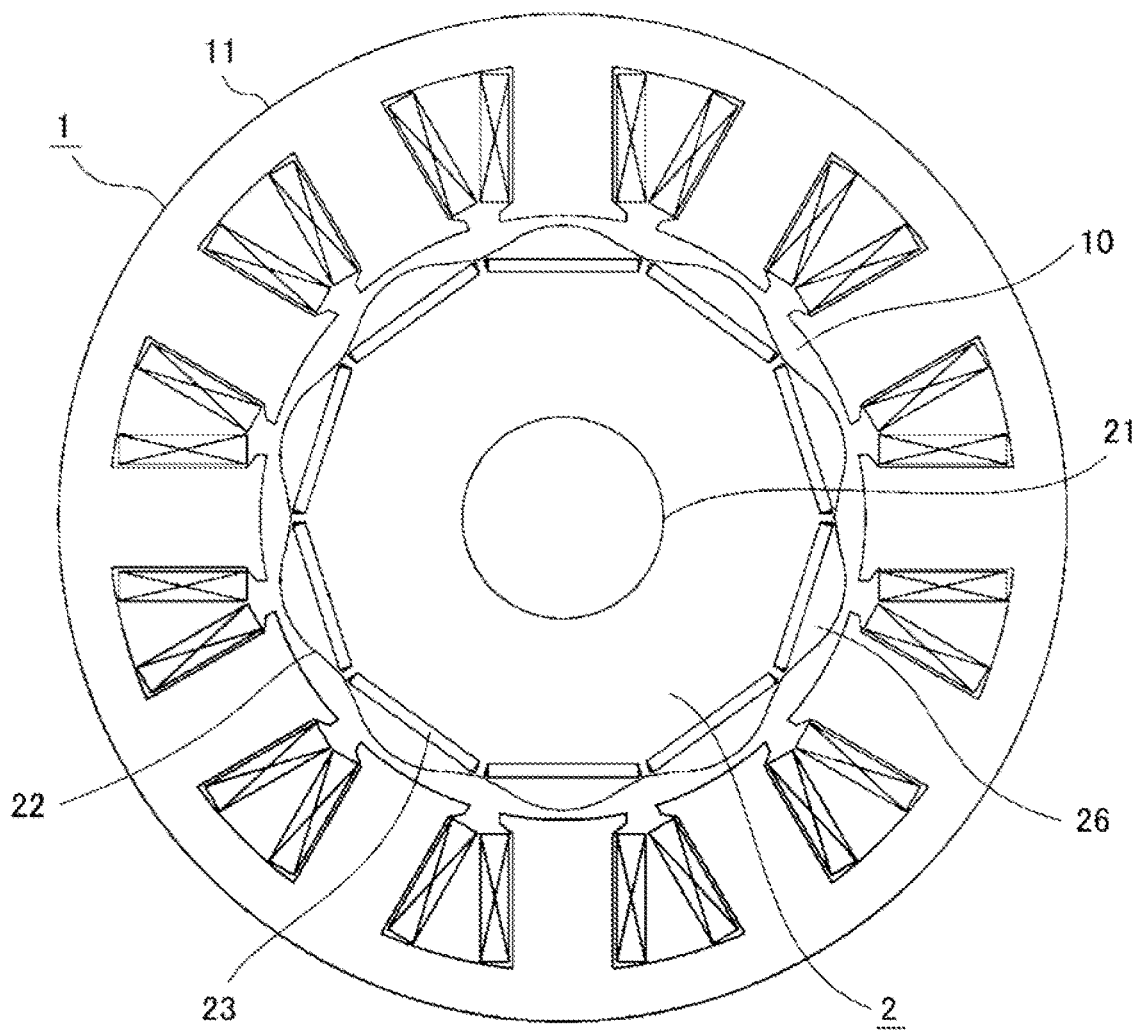
FIG. 15 is a cross-sectional view showing a modification of the rotating electrical machine according to Embodiment 3.
Figure 16:
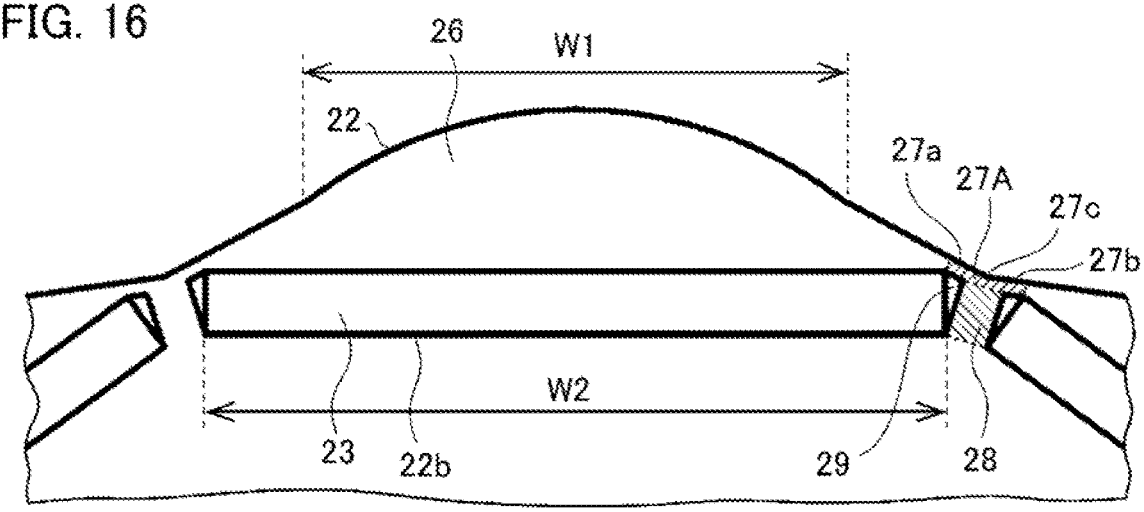
FIG. 16 is a partially enlarged cross-sectional view showing the modification of the rotating electrical machine according to Embodiment 3.

FIG. 15 and FIG. 16 show a modification of the rotating electrical machine according to Embodiment 3. In the rotor core 22 according to this modification, the width W1 in the circumferential direction of each petal portion 26 is smaller than the width W2 in the circumferential direction of each permanent magnet 23, and the outer circumferential surface of each interpole bridge 27A is formed by a first flat surface 27a and a second flat surface 27b. A connection portion 27c between the first flat surface 27a and the second flat surface 27b is recessed with respect to the magnetic gap 10. That is, similar to Embodiment 2 described above, each interpole bridge 27A and each interpole diameter bridge 28 have a Y cross-sectional shape perpendicular to the axial direction.

Figure 17:
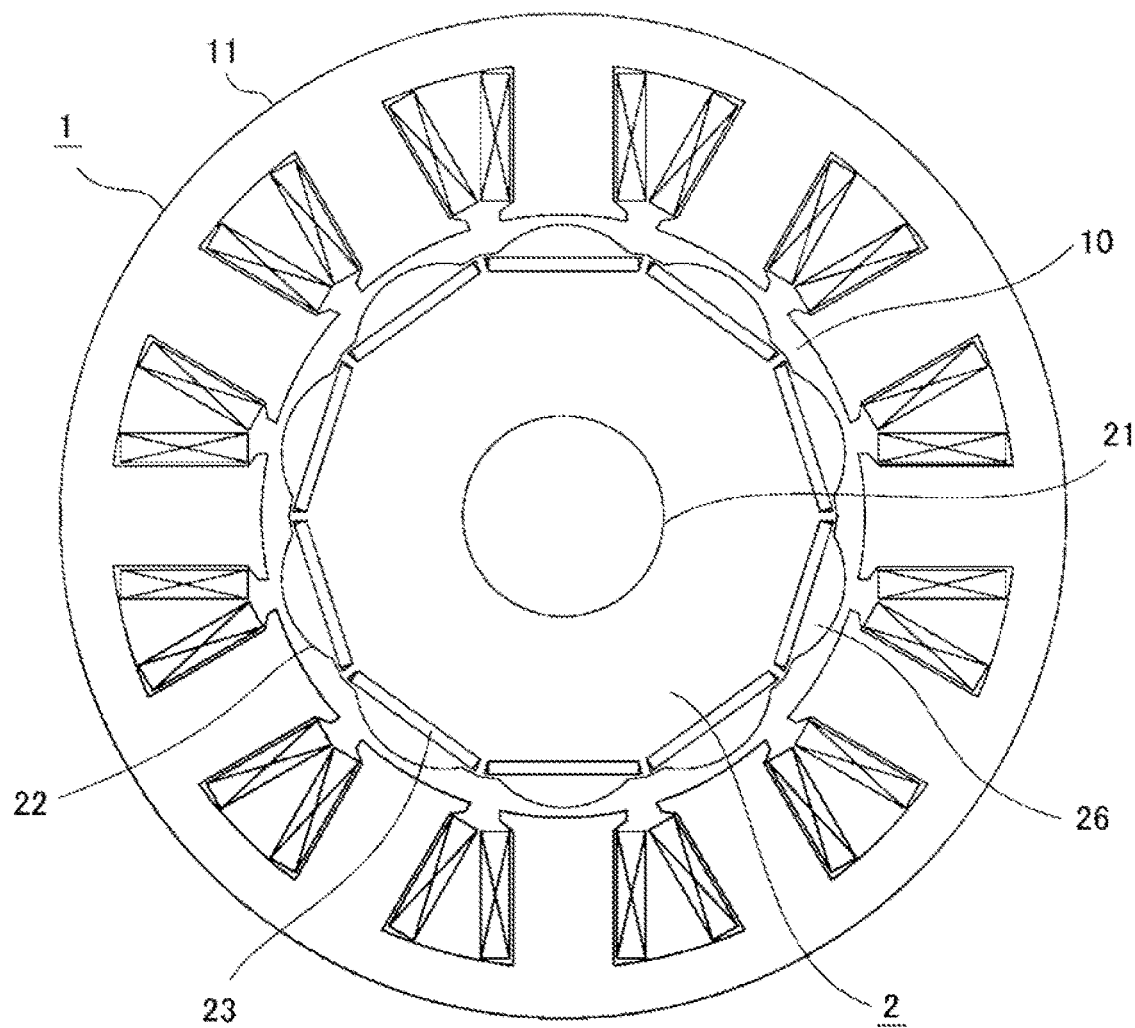
FIG. 17 is a cross-sectional view showing another modification of the rotating electrical machine according to Embodiment 3.
Figure 18:
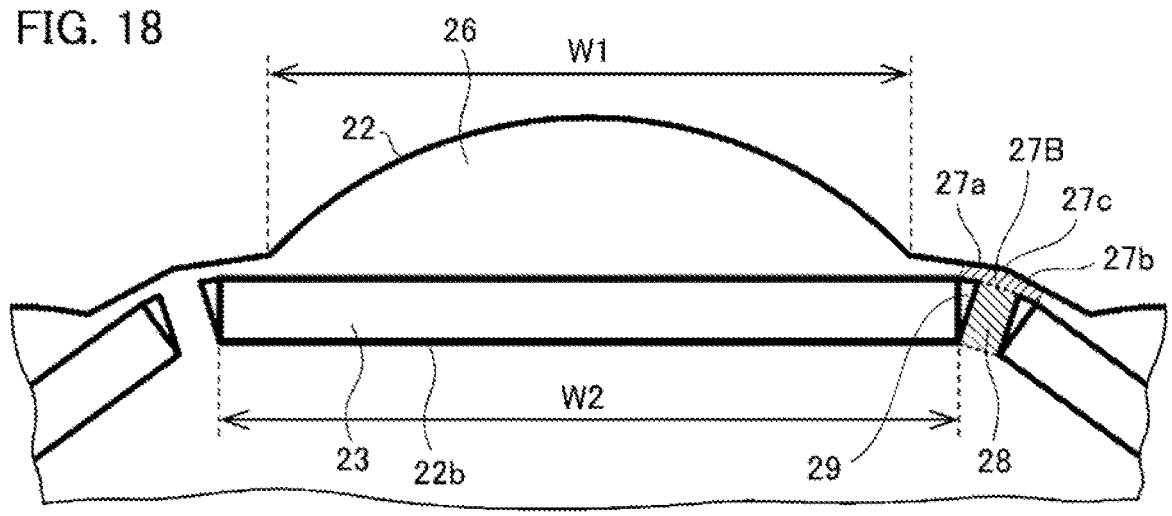
FIG. 18 is a partially enlarged cross-sectional view showing the other modification of the rotating electrical machine according to Embodiment 3.

FIG. 17 and FIG. 18 show another modification of the rotating electrical machine according to Embodiment 3. In the rotor core 22 according to the other modification, the width W1 in the circumferential direction of each petal portion 26 is smaller than the width W2 in the circumferential direction of each permanent magnet 23, and the outer circumferential surface of each interpole bridge 27B is formed by a first flat surface 27a and a second flat surface 27b. A connection portion 27c between the first flat surface 27a and the second flat surface 27b projects with respect to the magnetic gap 10. That is, similar to the modification of Embodiment 2 described above, each interpole bridge 27B and each interpole diameter bridge 28 have an arrow cross-sectional shape perpendicular to the axial direction. According to these modifications as well, the distance from the permanent magnet 23 to the magnetic gap 10 can be decreased as compared to Embodiment 1 described above.

According to Embodiment 3, in addition to the same effects as those of Embodiment 1 described above, since the distance from the permanent magnet 23 to the magnetic gap 10 can be decreased, the magnetic flux toward the stator core 11 can be increased and torque can be improved.

Embodiment 4

Figure 19:
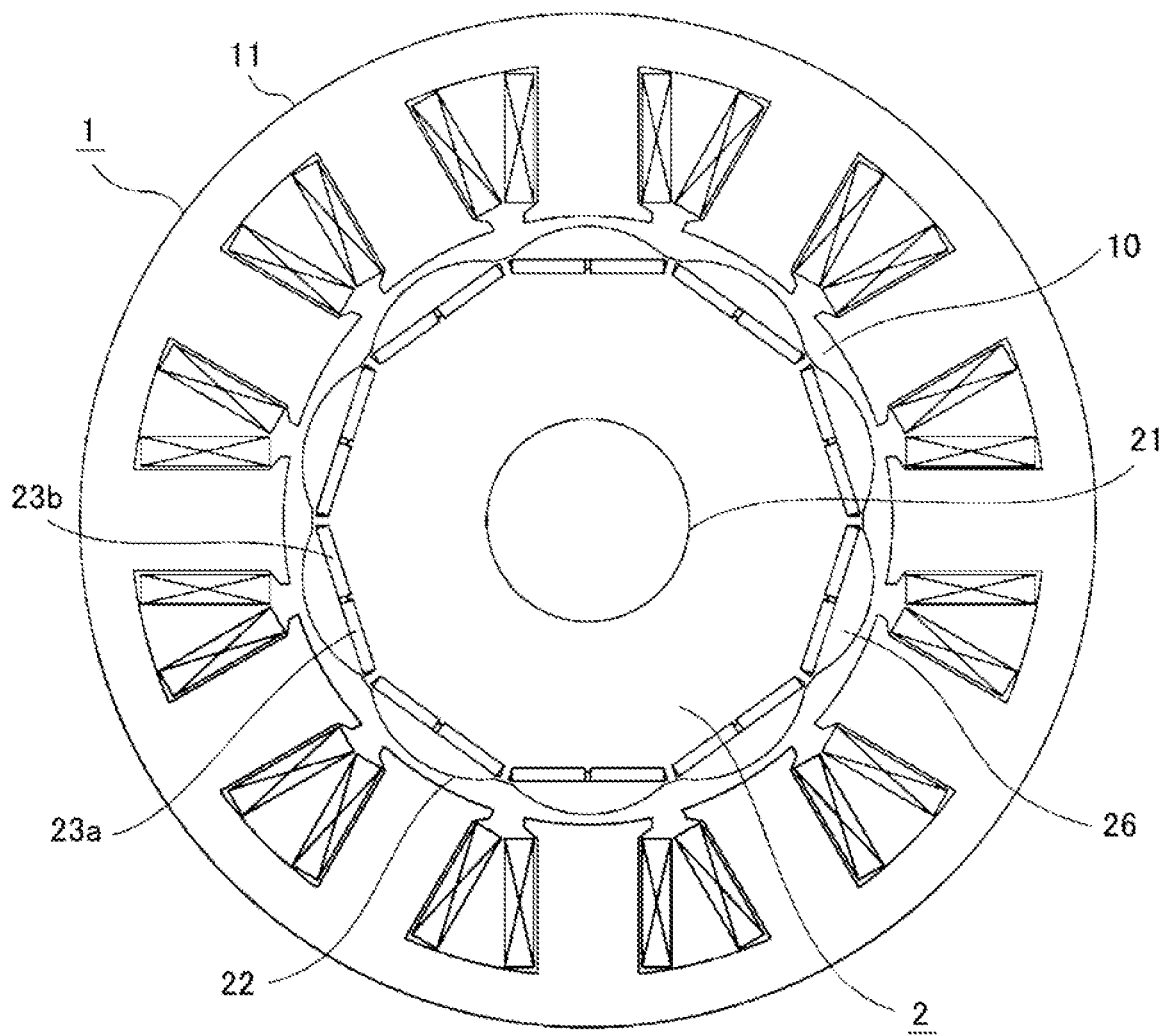
FIG. 19 is a cross-sectional view showing a rotating electrical machine according to Embodiment 4.
Figure 20:
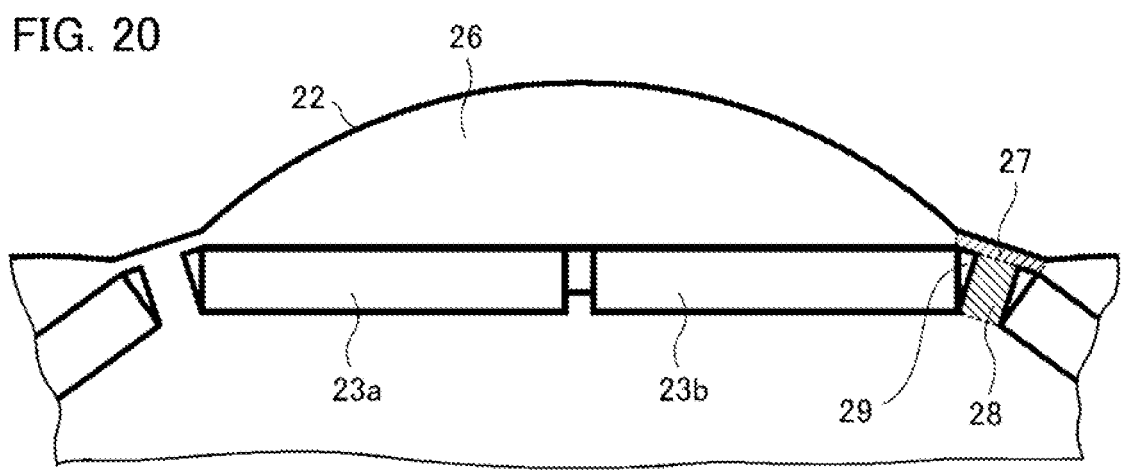
FIG. 20 is a partially enlarged cross-sectional view showing the rotating electrical machine according to Embodiment 4.

FIG. 19 and FIG. 20 are a cross-sectional view and a partially enlarged cross-sectional view, respectively, showing a rotating electrical machine according to Embodiment 4. In the rotating electrical machine according to Embodiment 4, one magnetic pole of the rotor core 22 is formed by a plurality of permanent magnets. The other configuration of the rotating electrical machine according to Embodiment 4 is substantially the same as that of Embodiment 1 described above, and thus the description thereof is omitted.

In the rotor core 22 according to Embodiment 4, one magnetic pole is formed by two permanent magnets 23a and 23b disposed in a linear manner. The polarities of these permanent magnets 23a and 23b coincide with each other. The permanent magnets 23a and 23b are each a rectangular parallelepiped having a rectangular cross-sectional shape perpendicular to the axial direction. The number of magnets forming one magnetic pole is not limited to two and may be three or more.

Figure 21:
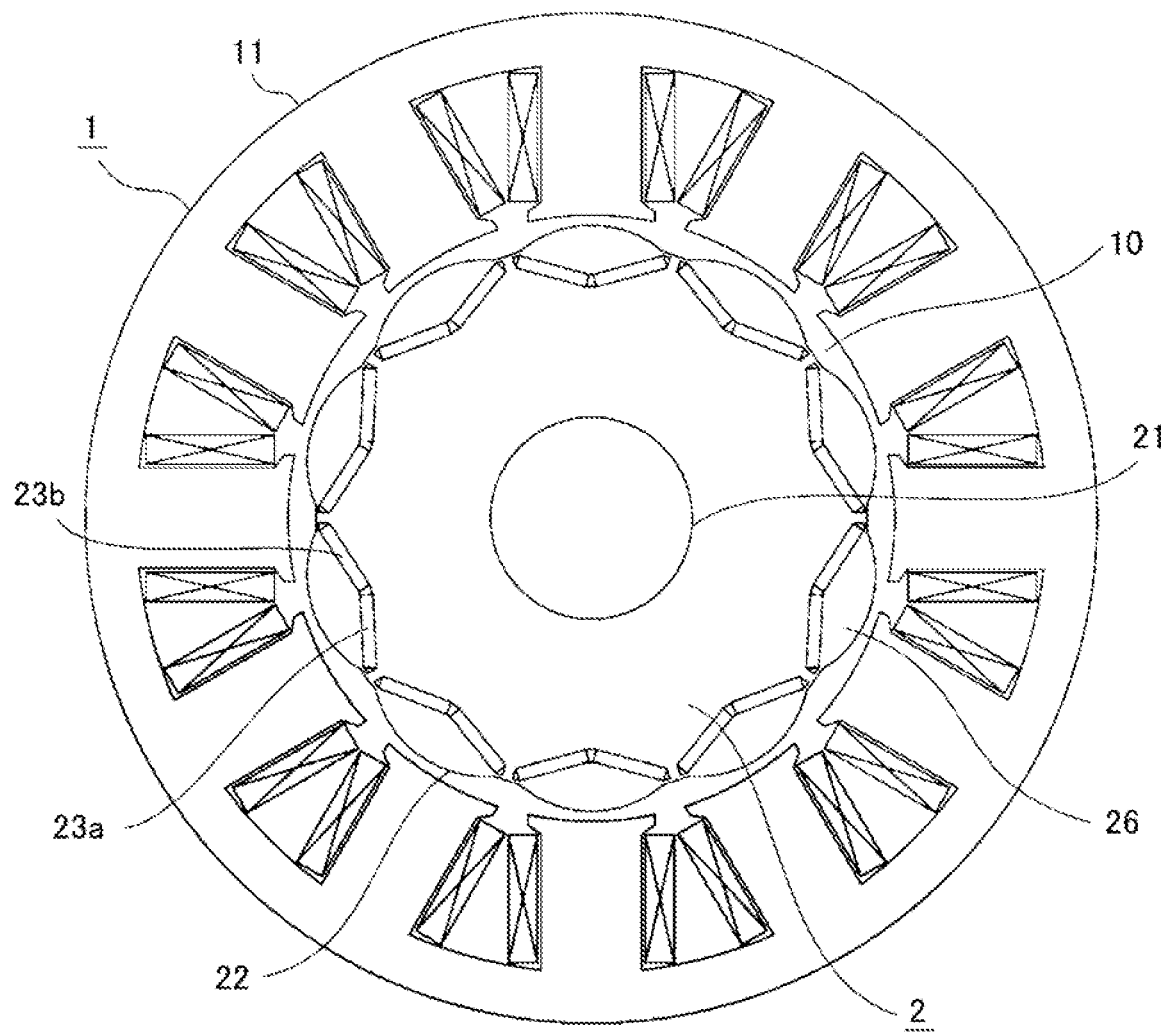
FIG. 21 is a cross-sectional view showing a modification of the rotating electrical machine according to Embodiment 4.
Figure 22:
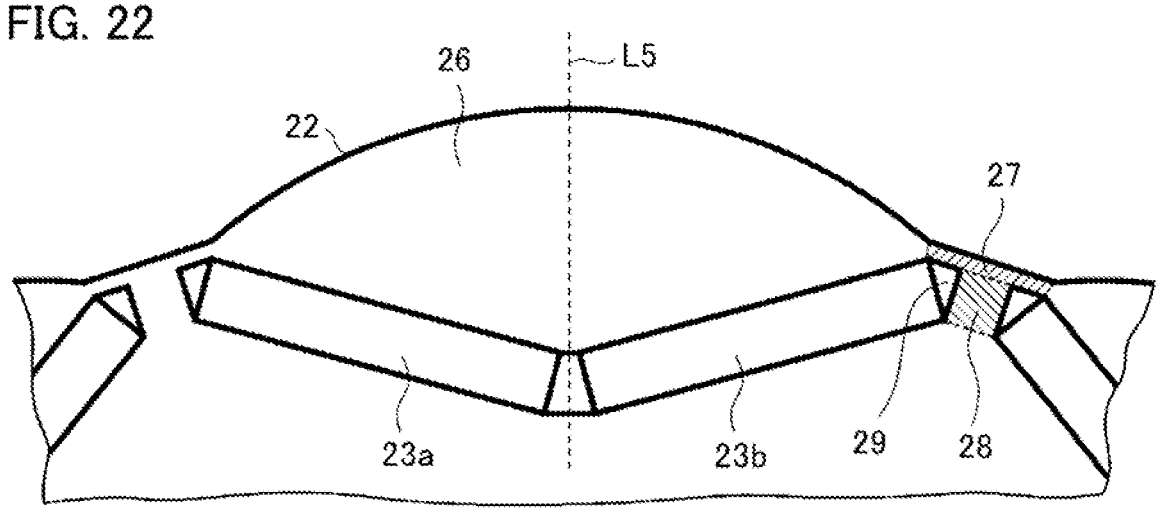
FIG. 22 is a partially enlarged cross-sectional view showing the modification of the rotating electrical machine according to Embodiment 4.

FIG. 21 and FIG. 22 show a modification of the rotating electrical machine according to Embodiment 4. In this modification, one magnetic pole is formed by two permanent magnets 23a and 23b disposed in a V shape. The two permanent magnets 23a and 23b are disposed so as to be axisymmetric with respect to a center line L5 in the circumferential direction of the magnetic pole.

According to Embodiment 4, in addition to the same effects as those of Embodiment 1 described above, by forming one magnetic pole by the plurality of permanent magnets 23a and 23b, the degree of freedom in the design of the path of the magnetic flux is improved. In addition, by disposing the two permanent magnets 23a and 23b in a V shape, the waveform of the magnetic flux density in the magnetic gap 10 can be made closer to a sine wave, so that improvement of torque and reduction of torque pulsation are achieved.

Embodiment 5

Figure 23:
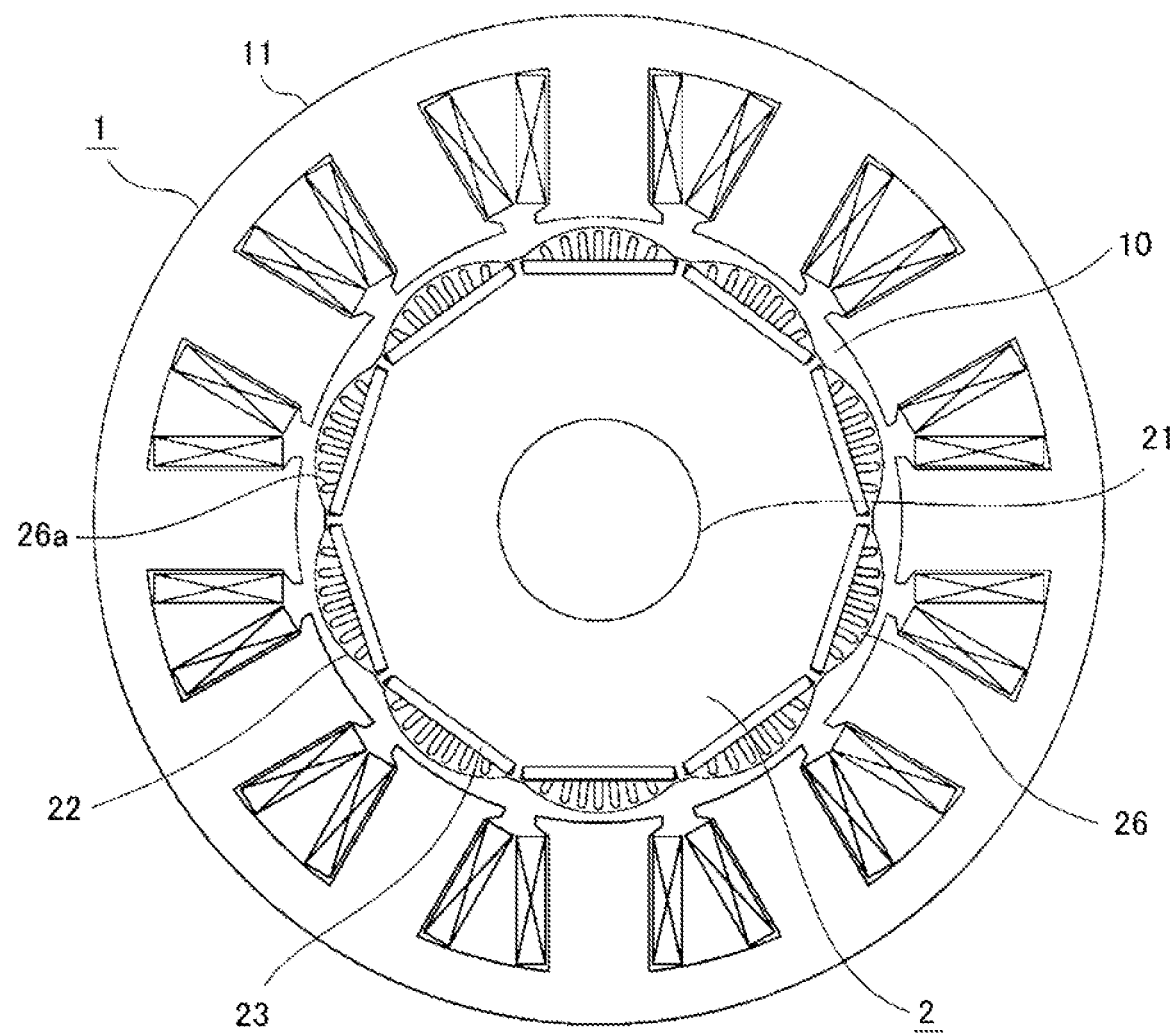
FIG. 23 is a cross-sectional view showing a rotating electrical machine according to Embodiment 5.
Figure 24:
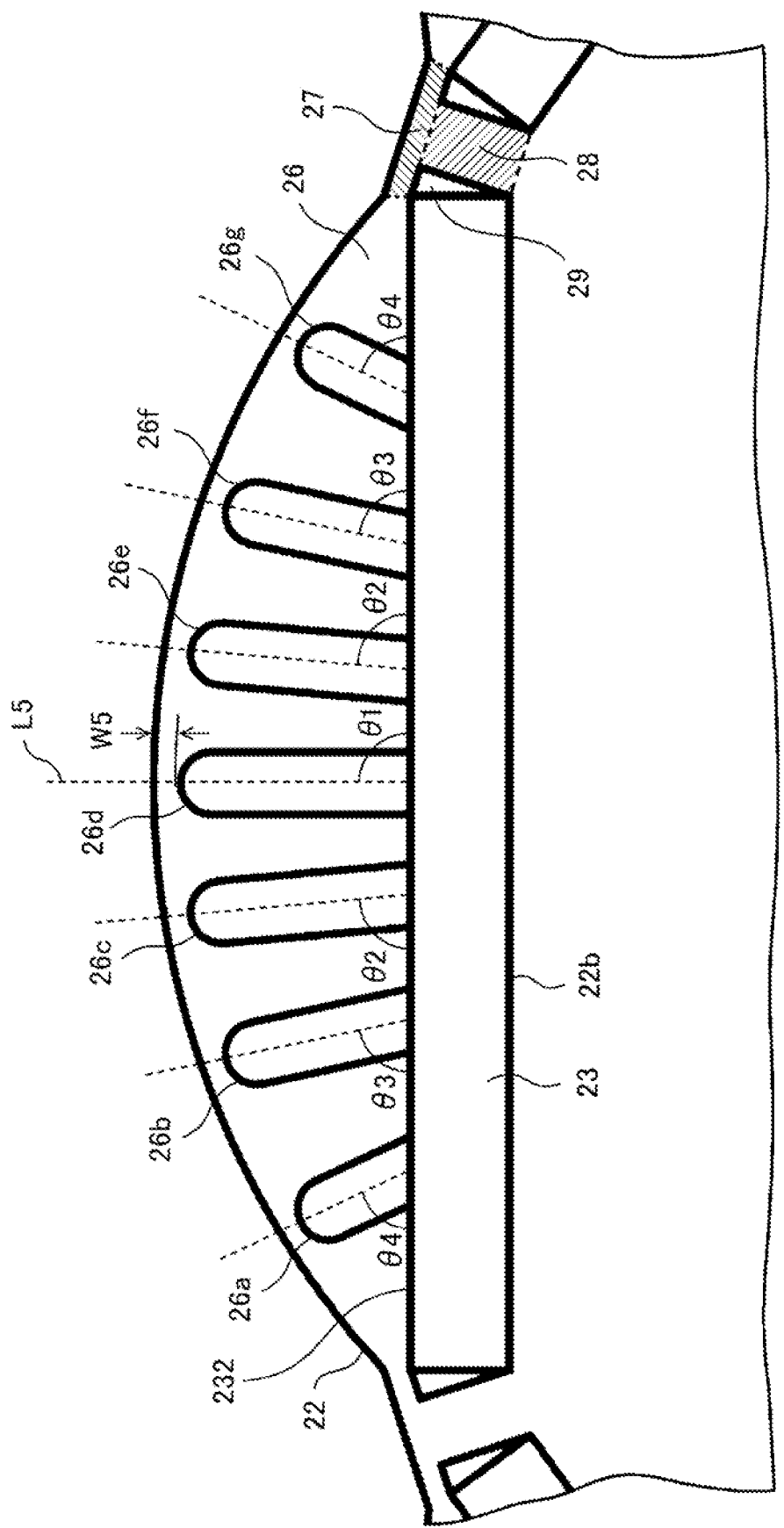
FIG. 24 is a partially enlarged cross-sectional view showing the rotating electrical machine according to Embodiment 5.

FIG. 23 and FIG. 24 are a cross-sectional view and a partially enlarged cross-sectional view, respectively, showing a rotating electrical machine according to Embodiment 5. In the rotating electrical machine according to Embodiment 5, each petal portion 26 of the rotor core 22 has slits 26a, 26b, 26c, 26d, 26e, 26f, and 26g (hereinafter, referred to as slits 26a to 26g) extending in the radial direction between the permanent magnet 23 and the magnetic gap 10. The other configuration of the rotating electrical machine according to Embodiment 5 is the same as that of Embodiment 1 described above, and thus the description thereof is omitted.

Similar to Embodiment 1 described above, the rotor core 22 according to Embodiment 5 has interpole bridges 27 each having a substantially rectangular cross-sectional shape perpendicular to the axial direction. In the case where each interpole bridge 27 is formed in a linear shape as described above, the length L3 (see FIG. 7A) of the path of the magnetic flux is lengthened, so that the magnetic resistance thereof is increased. Thus, the magnetic flux that bypasses this magnetic flux path and passes through the petal portion 26 in the circumferential direction is increased. Therefore, in Embodiment 5, by providing the slits 26a to 26g to the petal portions 26, the magnetic resistance of the path of the magnetic flux passing through each petal portion 26 in the circumferential direction is increased.

The plurality of slits 26a to 26g are located so as to be axisymmetric with respect to the center line L5 in the circumferential direction of the magnetic pole, that is, a center line in the circumferential direction of the petal portion 26. In addition, when angles $\theta$ ($\theta \leq 90°$) formed between the respective slits and an end face 232 in the radial direction of the permanent magnet 23 are denoted by $\theta 1$, $\theta 2, \ldots \theta n$ (here, n=4) in order from the slit closest to the center line L5 in the circumferential direction of the magnetic pole, $\theta 1 \geq \theta 2 \geq \ldots \geq \theta n$ is satisfied. Specifically, the angle $\theta 1$ formed between the slit 26d at the center and the end face 232 in the radial direction of the permanent magnet 23 is 90° and is the maximum, and the angles $\theta 2$ formed by the slits 26c and 26e on both sides of the slit 26d, the angles $\theta 3$ formed by the slits 26b and 26f on both sides thereof, and the angles $\theta 4$ formed by the slits 26a and 26g at both ends are smaller in this order ($\theta 1 \geq \theta 2 \geq \theta 3 \geq \theta 4$).

By radially disposing the plurality of slits 26a to 26g with respect to the center line L5 in the circumferential direction of the magnetic pole as described above, the width in the circumferential direction between adjacent slits is increased toward the magnetic gap 10. Accordingly, the strength of the core sheets 22a can be ensured during press-fitting of each permanent magnet 23 into the magnet hole 22b. In addition, a width W5 in the radial direction between the portion, of the slit 26d, closest to the magnetic gap 10, that is, the end of the slit 26d, and the outer circumferential surface of the petal portion 26 is larger than the thickness in the axial direction of each core sheet 22a. Accordingly, the manufacturability of the core sheets 22a by punching an electromagnetic steel sheet is improved. Although the rotor core 22 according to Embodiment 5 has seven slits 26a to 26g, the number of slits is not limited thereto and may be one.

According to Embodiment 5, in addition to the same effects as those of Embodiment 1 described above, by providing the slits 26a to 26g to each petal portion 26, the magnetic resistance of the path of the magnetic flux passing through the petal portion 26 in the circumferential direction can be increased. Accordingly, the q-axis inductance can be further reduced, and the rotation speed-torque characteristics of the electric motor are further improved.

In Embodiment 1 to Embodiment 5 described above, the rotating electrical machine with 10 poles and 12 slots has been described. However, even in the case where the number of poles and the number of slots are different from these numbers, the same effects are obtained. In addition, the internal rotation type rotating electrical machine in which the rotor 2 is disposed on the inner circumferential side of the stator 1 has been described as an example. However, with the configuration of the present disclosure, the same effects are also obtained for an external rotation type rotating electrical machine in which a rotor is disposed on the outer circumferential side of a stator. Furthermore, the rotating electrical machine in which at least one permanent magnet 23 is disposed at each of all magnetic poles has been described as an example. However, with the configuration of the present disclosure, the same effects are also obtained for a consequent pole type rotating electrical machine in which a magnet is disposed every other magnetic pole.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 100 stator
2, 200 rotor
3 frame
4 housing
5 bolt
6 first bearing
7 wall portion
8 second bearing
9 sensor unit
10 magnetic gap
11 stator core
11a core sheet
12 core back
13 tooth portion
14 slot
15 insulator
16 coil
21 shaft
22 rotor core
22a core sheet
22b magnet hole
23, 23a, 23b permanent magnet
24 pulley
25 sensor permanent magnet
26 petal portion
26a, 26b, 26c, 26d, 26e, 26f, 26g slit
27, 27A, 27B, 270 interpole bridge
27a first flat surface
27b second flat surface
27c connection portion
28 interpole diameter bridge
28a projection
29 flux barrier
30 ECU
31 first connector
32 second connector
33 power supply connector
34 housing
35 shaft
36 torque sensor
37 gearbox
38 tie rod
39 rack boot
40 electric motor (rotating electrical machine)
50 electric driving device
91 substrate
92 magnetic sensor
231 end face in circumferential direction
232 end face in radial direction
270a curved surface

The invention claimed is:

1. A rotating electrical machine comprising:
a rotor having a rotor core provided with a plurality of magnet holes in a circumferential direction, and permanent magnets embedded in the magnet holes and forming magnetic poles; and
a stator having a plurality of tooth portions which are disposed in the circumferential direction and on which coils are wound, wherein
the rotor is disposed on an inner circumferential side of the stator with a magnetic gap therebetween,
an outer circumferential portion of the rotor core has petal portions disposed so as to correspond to the respective magnetic poles and each having an arc shape with a diameter smaller than a rotor diameter, and interpole bridges each located at a non-magnetic portion between the adjacent magnetic poles and disposed on an outer circumferential side with respect to the permanent magnets,
the interpole bridges each have an outer circumferential surface facing the magnetic gap and formed by two flat surfaces, and
the two flat surfaces are arranged at an angle to each other such that a connection portion between the two flat surfaces is recessed with respect to the magnetic gap.

2. The rotating electrical machine according to claim 1, wherein
the rotor core has interpole diameter bridges each disposed between the two permanent magnets forming the adjacent magnetic poles, and
a center line in the circumferential direction of each of the interpole diameter bridges coincides with a center line in the circumferential direction of the non-magnetic portion.

3. The rotating electrical machine according to claim 2, wherein each of the interpole diameter bridges has a constant width in the circumferential direction.

4. The rotating electrical machine according to claim 2, wherein
the rotor core includes a plurality of magnetic core sheets stacked in an axial direction, and
the width in the circumferential direction of each of the interpole diameter bridges is larger than a thickness in the axial direction of each of the core sheets.

5. The rotating electrical machine according to claim 2, further comprising a flux barrier for blocking a leakage magnetic flux of the permanent magnet, in each of regions surrounded by the interpole bridges, the interpole diameter bridges, and end faces in the circumferential direction of the permanent magnets.

6. The rotating electrical machine according to claim 2, wherein the interpole diameter bridges have projections projecting in the circumferential direction.

7. The rotating electrical machine according to claim 1, wherein
the rotor core includes a plurality of magnetic core sheets stacked in an axial direction, and
a width measured in a radial direction of each of the interpole bridges is larger than a thickness in the axial direction of each of the core sheets.

8. A rotating electrical machine comprising:
a rotor having a rotor core provided with a plurality of magnet holes in a circumferential direction, and permanent magnets embedded in the magnet holes and forming magnetic poles; and a stator having a plurality of tooth portions which are disposed in the circumferential direction and on which coils are wound, wherein the rotor is disposed on an inner circumferential side of the stator with a magnetic gap therebetween, an outer circumferential portion of the rotor core has petal portions disposed so as to correspond to the respective magnetic poles and each having an arc shape with a diameter smaller than a rotor diameter, and interpole bridges each located at a non-magnetic portion between the adjacent magnetic poles and disposed on an outer circumferential side with respect to the permanent magnets, the interpole bridges each have an outer circumferential surface facing the magnetic gap and formed by two flat surfaces, and the two flat surfaces are arranged at an angle to each other such that a connection portion between the two flat surfaces projects with respect to the magnetic gap.

9. The rotating electrical machine according to claim 1, wherein a width in the circumferential direction of each of the petal portions is equal to or smaller than a width in the circumferential direction of each of the permanent magnets.

10. The rotating electrical machine according to claim 1, wherein each of the permanent magnets is a rectangular parallelepiped having a rectangular cross-sectional shape perpendicular to the axial direction.

11. The rotating electrical machine according to claim 1, wherein the magnetic poles are each formed by a plurality of the permanent magnets.

12. The rotating electrical machine according to claim 1, wherein the petal portions each have a slit extending in the radial direction between the permanent magnet and the magnetic gap.

13. The rotating electrical machine according to claim 12, wherein a plurality of the slits are located so as to be axisymmetric with respect to a center line in the circumferential direction of the magnetic pole, and when angles $\theta$ of 90° or less formed between the slits and an end face in the radial direction of the permanent magnet are denoted by $\theta 1, \theta 2, \ldots \theta n$ in order from the slit closest to the center line in the circumferential direction of the magnetic pole, $\theta 1 \geq \theta 2 \geq \ldots \geq \theta n$ is satisfied.

14. The rotating electrical machine according to claim 12, wherein the rotor core includes a plurality of magnetic core sheets stacked in the axial direction, and a length measured in the radial direction between an end of the slit and an outer circumferential surface of the petal portion is larger than a thickness in the axial direction of each of the core sheets.

* * * * *